United States Patent
Padmanabhan

(10) Patent No.: US 11,080,247 B2
(45) Date of Patent: Aug. 3, 2021

(54) FIELD-BASED PEER PERMISSIONS IN A BLOCKCHAIN NETWORK

(71) Applicant: salesforce.com, inc., San Francisco, CA (US)

(72) Inventor: Prithvi Krishnan Padmanabhan, San Ramon, CA (US)

(73) Assignee: salesforce.com, inc., San Francisco, CA (US)

( * ) Notice: Subject to any disclaimer, the term of this patent is extended or adjusted under 35 U.S.C. 154(b) by 320 days.

(21) Appl. No.: 16/228,555

(22) Filed: Dec. 20, 2018

(65) Prior Publication Data

US 2020/0089663 A1    Mar. 19, 2020

Related U.S. Application Data

(60) Provisional application No. 62/733,535, filed on Sep. 19, 2018.

(51) Int. Cl.
| | | |
|---|---|---|
| *H04L 29/06* | (2006.01) | |
| *G06F 16/182* | (2019.01) | |
| *H04L 9/00* | (2006.01) | |
| *H04L 9/06* | (2006.01) | |

(52) U.S. Cl.
CPC .......... *G06F 16/1837* (2019.01); *H04L 9/006* (2013.01); *H04L 9/0618* (2013.01); *H04L 9/0643* (2013.01); *H04L 2209/38* (2013.01)

(58) Field of Classification Search
None
See application file for complete search history.

(56) References Cited

U.S. PATENT DOCUMENTS

| | | |
|---|---|---|
| 7,730,478 B2 | 6/2010 | Weissman |
| 8,326,876 B1 | 12/2012 | Venkataraman et al. |
| 8,886,671 B1 | 11/2014 | Ro et al. |
| 9,075,889 B2 | 7/2015 | Calvin et al. |

(Continued)

FOREIGN PATENT DOCUMENTS

| | | |
|---|---|---|
| WO | 2016161073 A1 | 10/2016 |
| WO | 2018007828 A2 | 1/2018 |

OTHER PUBLICATIONS

International Search Report and Written Opinion, Intl. App. No. PCT/US2019/051781, dated Dec. 10, 2019, 13 pages.

(Continued)

*Primary Examiner* — Maung T Lwin
(74) *Attorney, Agent, or Firm* — NDWE LLP

(57) ABSTRACT

A method for a multi-tenant server to manage data in a blockchain network is described. The method includes generating an exchange object for the network, wherein the exchange object includes a set of exchange fields and a mapping between each exchange field in the set of exchange fields and a field of an object associated with each peer in the network; determining permissions for each exchange field and for each peer in the network; generating, on behalf of a first peer in the network, a transaction object using the exchange object, wherein the transaction object includes a set of field values for the set of exchange fields and one or more field values in the set of values are encrypted based on the permissions; and making the transaction object available to a second peer in the network to attempt to obtain consensus for altering an object of the first peer.

20 Claims, 12 Drawing Sheets

(56) References Cited

U.S. PATENT DOCUMENTS

| | | | |
|---|---|---|---|
| 9,276,995 B2 | 3/2016 | Calvin et al. | |
| 9,317,843 B2 * | 4/2016 | Bradley | G06F 16/951 |
| 9,448,773 B2 | 9/2016 | Calvin et al. | |
| D768,690 S | 10/2016 | Conn | |
| 9,525,720 B2 | 12/2016 | Calvin et al. | |
| 9,572,614 B2 | 2/2017 | Calvin et al. | |
| 9,635,090 B2 | 4/2017 | Calvin et al. | |
| D800,148 S | 10/2017 | Conn | |
| 9,811,506 B2 | 11/2017 | Calvin | |
| 9,992,022 B1 * | 6/2018 | Chapman | G06F 21/604 |
| 10,027,735 B2 | 7/2018 | Calvin et al. | |
| 10,117,697 B2 | 11/2018 | Calvin et al. | |
| 10,212,209 B2 | 2/2019 | Calvin et al. | |
| 10,489,786 B2 | 11/2019 | Yu et al. | |
| 2002/0194501 A1 * | 12/2002 | Wenocur | H04L 63/12 |
| | | | 726/4 |
| 2003/0149934 A1 | 8/2003 | Worden | |
| 2008/0034228 A1 * | 2/2008 | Shear | G06Q 30/0257 |
| | | | 713/194 |
| 2010/0005443 A1 | 1/2010 | Kwok et al. | |
| 2011/0276490 A1 * | 11/2011 | Wang | H04L 9/14 |
| | | | 705/50 |
| 2013/0290406 A1 | 10/2013 | Calvin et al. | |
| 2014/0122649 A1 | 5/2014 | Calvin et al. | |
| 2014/0122993 A1 | 5/2014 | Calvin et al. | |
| 2014/0304692 A1 | 10/2014 | Calvin et al. | |
| 2015/0127781 A1 | 5/2015 | Calvin et al. | |
| 2015/0348017 A1 * | 12/2015 | Allmen | G06Q 20/401 |
| | | | 705/76 |
| 2015/0379510 A1 * | 12/2015 | Smith | G06Q 20/3829 |
| | | | 705/71 |
| 2016/0012465 A1 | 1/2016 | Sharp | |
| 2016/0021166 A1 | 1/2016 | Calvin et al. | |
| 2016/0048481 A1 | 2/2016 | Calvin | |
| 2016/0088058 A1 | 3/2016 | Calvin et al. | |
| 2016/0098723 A1 | 4/2016 | Feeney | |
| 2016/0162873 A1 * | 6/2016 | Zhou | G06Q 20/3674 |
| | | | 705/67 |
| 2016/0164947 A1 | 6/2016 | Calvin et al. | |
| 2017/0048301 A1 | 2/2017 | Calvin et al. | |
| 2017/0140408 A1 | 5/2017 | Wuehler | |
| 2017/0178127 A1 | 6/2017 | Kravitz | |
| 2017/0252085 A1 | 9/2017 | Calvin et al. | |
| 2017/0337534 A1 * | 11/2017 | Goeringer | G06Q 50/188 |
| 2017/0344618 A1 | 11/2017 | Horowitz et al. | |
| 2018/0005186 A1 | 1/2018 | Hunn | |
| 2018/0006831 A1 | 1/2018 | Toll et al. | |
| 2018/0018723 A1 | 1/2018 | Nagla et al. | |
| 2018/0173719 A1 | 6/2018 | Bastide et al. | |
| 2018/0219676 A1 | 8/2018 | Mattingly et al. | |
| 2018/0248880 A1 | 8/2018 | Sardesai et al. | |
| 2018/0285322 A1 | 10/2018 | Calvin | |
| 2019/0005268 A1 * | 1/2019 | Gupta | G06K 19/06037 |
| 2019/0058709 A1 | 2/2019 | Kempf et al. | |
| 2019/0087449 A1 | 3/2019 | Rybacki et al. | |
| 2019/0179951 A1 | 6/2019 | Brunet et al. | |
| 2019/0236559 A1 | 8/2019 | Padmanabhan | |
| 2019/0236562 A1 | 8/2019 | Padmanabhan | |
| 2019/0236598 A1 | 8/2019 | Padmanabhan | |
| 2019/0236606 A1 | 8/2019 | Padmanabhan et al. | |
| 2019/0238316 A1 | 8/2019 | Padmanabhan | |
| 2019/0238525 A1 | 8/2019 | Padmanabhan et al. | |
| 2019/0303121 A1 | 10/2019 | Padmanabhan | |
| 2019/0303445 A1 | 10/2019 | Padmanabhan | |
| 2019/0377806 A1 | 12/2019 | Padmanabhan et al. | |
| 2019/0379721 A1 | 12/2019 | Calvin et al. | |
| 2020/0042939 A1 | 2/2020 | Padmanabhan | |
| 2020/0074457 A1 | 3/2020 | Coleman et al. | |
| 2020/0084027 A1 | 3/2020 | Duchon et al. | |
| 2020/0185070 A1 | 6/2020 | Dahmani | |

OTHER PUBLICATIONS

International Search Report and Written Opinion, Intl. App. No. PCT/US2019/051782, dated Jan. 10, 2020, 12 pages.

International Search Report and Written Opinion, Intl. App. No. PCT/US2019/051783, dated Dec. 11, 2019, 11 pages.

Nakamoto, Satoshi, "Bitcoin: A Peer-to-Peer Electronic Cash System", Satoshi Nakamoto Institute, Oct. 31, 2008, 9 pages.

Xia et al., "MeDShare: Trust-Less Medical Data Sharing Among Cloud Service Providers via Blockchain" IEEE Access, vol. 5, 2017, pp. 14757-14767.

Yu et al., "Virtualization for Distributed Ledger Technology (vDLT)", IEEE Access, vol. 6, 2018, pp. 25019-25028.

International Search Report and Written Opinion for Application No. PCT/US2019/036103, dated Aug. 1, 2019, 12 pages.

Non Final Office Action, U.S. Appl. No. 16/228,501, dated Oct. 28, 2020, 10 pages.

Non-Final Office Action, U.S. Appl. No. 16/228,528, dated Oct. 9, 2020, 11 pages.

Non-Final Office Action, U.S. Appl. No. 161228,569, dated May 13, 2021, 15 pages.

Non-Final Rejection, U.S. Appl. No. 16/136,077, dated Jun. 9, 2021, 11 pages.

* cited by examiner

| TRANSACTION OBJECT 802 |||
|---|---|---|
| EXCHANGE FIELD 504₁ | EXCHANGE FIELD 504₂ | EXCHANGE FIELD 504₃ |
| FIELD VALUE 706₁,₂ | FIELD VALUE 706₁,ₙ | FIELD VALUE 706₁,₁ |

FIG. 8

FIELD-BASED PEER PERMISSIONS IN A BLOCKCHAIN NETWORK

CROSS-REFERENCE TO RELATED APPLICATIONS

This application claims the benefit of U.S. Provisional Application No. 62/733,535, filed Sep. 19, 2018, which is hereby incorporated by reference.

TECHNICAL FIELD

One or more implementations relate to the field of data management; and more specifically, to assigning and enforcing peer-based permissions to fields of data stored in a peer-to-peer blockchain network.

BACKGROUND

A blockchain is a continuously expanding list of records/blocks that are linked and secured using cryptography. In particular, every block in a blockchain may include a cryptographic hash of the immediately preceding block, a timestamp for the current block, and transaction data (e.g., the addition/modification of information associated with a peer in a blockchain network). Further, the blockchain may be shared and managed through a peer-to-peer network via a system of verifying/validating new blocks to be added to the chain such that a block in a blockchain cannot be altered without alteration of all subsequent blocks, which requires network consensus. This architecture allows for security of information stored within blocks through the use of cryptography; sharing/distribution of information through the use of peer-to-peer networks; trust through the use of consensus of block addition; and immutability of information stored within blocks through the use of cryptography, chaining/linking of blocks, and peer distribution (e.g., each peer in the blockchain network may maintain a ledger of all verified/validated transactions in the network).

In contrast to a blockchain architecture, a multi-tenant cloud architecture relies on centralization of information in a common database or other data structure. Although cloud-based architectures provide many benefits in comparison to blockchain architectures, including the ability to remove many management functions from tenants and instead focus these functions on a centralized system, these architectures do not provide the same level of security, trust, and immutability of information during inter-tenant communications of data. Further, although blockchain architectures provide many benefits, including those described above, these architectures do not allow for secrecy between peers or enforcement of other access permissions/privileges. Namely, each piece of information in a block of a peer-ledger is visible to all peers in a blockchain network and each peer has the same permissions/privileges in the blockchain network.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 8 shows an example of a transaction object, according to one example implementation.

DETAILED DESCRIPTION

Figure 1:
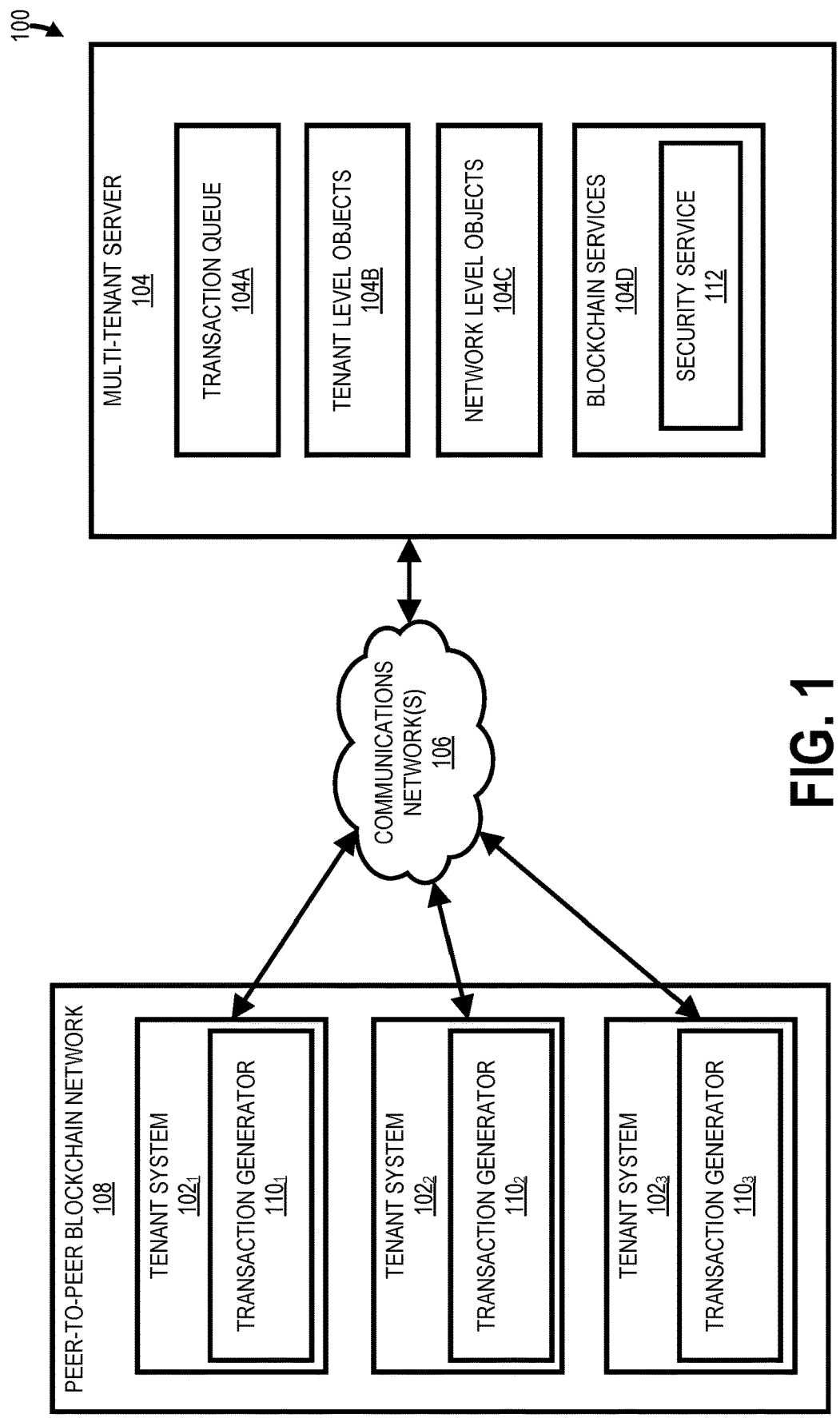
FIG. 1 shows a block diagram illustrating a computing environment, including a multi-tenant server, according to one example implementation.

FIG. 1 is a block diagram illustrating a computing environment 100, according to one example implementation. The computing environment 100 includes tenant systems $102_1$-$102_3$, a multi-tenant server 104, and a set of communications networks 106. In this example computing environment 100, the tenant systems $102_1$-$102_3$ may be part of a peer-to-peer blockchain network 108 and the multi-tenant server 104 provides a cloud environment to manage data and transactions of the tenant systems $102_1$-$102_3$ in the peer-to-peer blockchain network 108 via a transaction queue 104A, tenant level objects 104B, network level objects 104C, and blockchain services 104D, including a security service 112. For example, the blockchain services 104D may generate mapping data that maps fields of physical objects of tenant systems 102 to exchange fields, which are used for processing transactions in the peer-to-peer blockchain network 108. Additionally, the blockchain services 104D may generate public and private keys for each tenant system 102 in the blockchain network 108 and assign/enforce permissions/privileges in relation to exchange fields using these keys. Namely, exchange fields may be encrypted using private and/or public keys of tenant systems 102 that are permitted to access these fields and separate sets of keys may be provided to corresponding tenant systems 102 for different permission/privilege levels.

For example, as will be described in greater detail below, a transaction generator $110_1$ of the tenant system $102_1$ may generate a request to (1) add/insert a new record to/into a physical object associated with the tenant system $102_1$ or (2) modify/update an existing record of the physical object associated with the tenant system $102_1$. The physical object may include a set of fields for each record and is stored in a portion/partition of the tenant level objects 104B of the multi-tenant server 104 associated with the tenant system $102_1$ such that the physical object is only accessible to the tenant system $102_1$ (e.g., the tenant system $102_2$ and the tenant system $102_3$ are not permitted to read or write to the physical object of the tenant system $102_1$). The request may cause the addition of a record in a shadow object in the portion/partition of the tenant level objects 104B associated with the tenant system $102_1$. The shadow object represents uncommitted data to the physical object (i.e., data for which a consensus amongst the peers/tenants in the peer-to-peer blockchain network 108 has not yet been achieved). The shadow object may be used by the transaction queue 104A for generating a transaction object, which will be distributed/made available to the other tenant systems $102_2$ and $102_3$ for receiving consensus for the proposed addition/modification to the physical object of the tenant system $102_1$.

In one implementation, the set of fields of the transaction object is a subset of the fields of the physical object and the set of fields of the transaction object are defined by an exchange object, which is included in the network level objects 104C. In this implementation, the exchange object may include a set of exchange fields, which will be included in the transaction object, and each exchange field of the exchange object may be mapped to a field in the physical objects of the tenant systems $102_1$-$102_3$. For example, a physical object of the tenant system $102_1$ may include fields A-D, a physical object of the tenant system $102_2$ may include fields E-H, and a physical object of the tenant system $102_3$ may include fields I-K. In this example, a first exchange field of the exchange object of the peer-to-peer blockchain network 108 may be mapped to the field B of the tenant system $102_1$, the field F of the tenant system $102_2$, and the field I of the tenant system $102_3$. Similarly, a second exchange field of the exchange object of the peer-to-peer blockchain network 108 may be mapped to the field C of the tenant system $102_1$, the field E of the tenant system $102_2$, and the field J of the tenant system $102_3$. Accordingly, when a proposal for adding/modifying a record for the physical object of the tenant system $102_1$ is received, the corresponding transaction object includes the first exchange field with a value from field B of the proposed physical/shadow object and the second exchange field with a value from field C of the proposed physical/shadow object. The exchange object provides a uniform transaction object via mapping metadata for verification/validation purposes in the peer-to-peer blockchain network 108 while allowing the tenant system $102_1$ to only reveal particular portions of information to other tenants/peers in the peer-to-peer blockchain network 108 (e.g., sensitive information/fields in physical objects may not be included in transaction objects which are distributed amongst tenant systems $102_1$-$102_3$ in the peer-to-peer blockchain network 108 and later included in distributed ledgers).

As described herein, the multi-tenant server 104 may perform many of the functions of the peer-to-peer blockchain network 108 on behalf of the tenant systems $102_1$-$102_3$. In particular, the multi-tenant server 104 may include a virtual space/organization for each of the tenant systems $102_1$-$102_3$. Each virtual space/organization may include data and applications/services for corresponding tenant systems $102_1$-$102_3$ and is logically separate from all other virtual spaces/organizations of other tenant systems $102_1$-$102_3$. For example, each virtual space/organization may include tenant level objects 104B corresponding to respective tenants/tenant systems $102_1$-$102_3$ and separate instantiations of or access to blockchain services 104D. In this configuration/architecture, the virtual space/organization for each tenant system $102_1$-$102_3$ may perform one or more blockchain functions/operations on behalf of the corresponding tenant system $102_1$-$102_3$. For example, in response to receipt of a request from the tenant system $102_1$ to add/insert a new record to/into or modify/update an existing record of a physical object of the tenant system $102_1$, the multi-tenant server 104 may generate a shadow object record in the virtual space/organization of the tenant system $102_1$ within the multi-tenant server 104. In response, a transaction queue 104A may generate a transaction object corresponding to the record in the shadow object using the exchange object of the peer-to-peer blockchain network 108, such that the transaction object includes exchange fields with data from the shadow object, and a set of cryptographic keys of the tenant system $102_1$ such that the transaction object may be distributed or otherwise be made available to virtual spaces/organizations of the other tenant system $102_2$ and $102_3$.

In particular, the security service 112 of the blockchain services 104D may encrypt each exchange field of a transaction object based on permission/privilege levels of each tenant system 102. For example, the security service 112 may determine that the tenant system $102_1$ has read, update, and insert permissions/privileges for first and second exchange fields. In contrast, the tenant system $102_2$ may only have read permission for the first exchange field and read and update permissions for the second exchange field. Lastly, the tenant system $102_3$ may have no permissions/privileges in relation to the first exchange field and read, update, and insert privileges for the second exchange field. In this example situation, the security service 112 may generate a first set of keys for the tenant system $102_1$, a second set of keys for the tenant system $102_2$, and a third set of keys for the tenant system $102_3$ based on the private and public keys of the tenant system $102_1$-$102_3$ and the assigned permission/privilege levels. The first set of keys allow the tenant system $102_1$ to read, update, and insert data in relation to the first and second exchange fields; the second set of keys allow the tenant system $102_2$ to read the first exchange field and read and update the second exchange field; and the third set of keys allow the tenant system $102_3$ to read, update, and insert data in relation to the second exchange field. Accordingly, as described above and as will be described in greater detail below, the security service 112 of the multi-tenant server 104 provides permission/privilege level control of data in the blockchain network 108.

After distribution of the transaction object, the virtual spaces/organizations of the other tenant systems $102_2$ and $102_3$ may thereafter analyze the transaction object to determine whether validation/verification is appropriate. The transaction queue 104A may wait for validation/verification from the virtual spaces/organizations of the tenant systems $102_2$ and $102_3$ such that consensus for the proposed alteration to the physical object of the tenant system $102_1$ is achieved. In response to this consensus, a virtual space/organization of a leader tenant system $102_1$-$102_3$ may (1) add a record or modify a record (as appropriate) in a corresponding physical object and (2) add a corresponding entry/block to a distributed ledger of the leader tenant system $102_1$-$102_3$. Thereafter, the virtual space/organization of a leader tenant system $102_1$-$102_3$ may transmit a request to the virtual spaces/organizations of the other/remaining tenant systems $102_1$-$102_3$ to commit the change to their physical objects (based on a mapping defined in the exchange object) and/or add a corresponding entry/block to a ledger of these tenant systems $102_1$-$102_3$. As illustrated above and as will be described in greater detail below, the cloud environment provided by the multi-tenant server 104 (e.g., the virtual spaces/organizations provided by the multi-tenant server 104) may be used for managing blockchain transactions between the tenant systems $102_1$-$102_3$. In particular, the security service 112 encrypts exchange fields such that permissions/privileges (e.g., read, update, and insert permissions/privileges) may be enforced per peer/tenant system 102 and per exchange field.

Each element of the computing environment 100 of FIG. 1 will now be described in greater detail below by way of example. In some implementations, the computing environment 100 may include more elements than those shown in FIG. 1. Accordingly, the computing environment 100 of FIG. 1 is purely for illustrative purposes.

As shown in FIG. 1 and described above, the tenant systems $102_1$-$102_3$ and the multi-tenant server 104 may be connected through a set of one or more communication networks 106. The set of one or more communication networks 106 may be, for example, a local area network (LAN), a wide area network (WAN), a global area network (GAN), such as the Internet, or a combination of such networks. In another implementation, the tenant systems $102_1$-$102_3$ and the multi-tenant server 104 may maintain a direct connection to each other via a wired or wireless medium.

Each of the tenant systems $102_1$-$102_3$ may be a computing system that may be operated by one or more users. For example, each of the tenant systems $102_1$-$102_3$ may be a personal computer (PC), a workstation, a laptop computer, a tablet computer, a mobile phone, a smartphone, a personal digital assistant (PDA), or the like. As will be described in greater detail below, the tenant systems $102_1$-$102_3$ may communicate with the multi-tenant server 104 to modify/add/store and retrieve data.

The tenant systems $102_1$-$102_3$ (sometimes referred to as client, peer, or user systems) may each include a screen/display (e.g., a liquid crystal (LCD) display) for presenting an interface (e.g., a graphical user interface (GUI)) to a user, including an interface presented in a web page. As will be described in greater detail below, each of the tenant systems $102_1$-$102_3$ may include a corresponding transaction generator $110_1$-$110_3$ for receiving inputs from a user to alter a physical object associated with the tenant system $102_1$-$102_3$ (e.g., addition of a new record in the physical object or modification of an existing record in the physical object) and triggering the process of obtaining consensus (e.g., verification/validation) from the other tenant systems $102_1$-$102_3$ in the peer-to-peer blockchain network 108 for the alteration.

The tenant systems $102_1$-$102_3$ may each be associated with one or more organizations/tenants. For example, users of the tenant system $102_1$ may be customers of a first organization/tenant and a user of the tenant system $102_3$ may be a customer of a second organization/tenant. Organizations/tenants may be any firm, corporation, institution, association, or society that has contracted with an administrator of the multi-tenant server 104 to provide users access to data stored therein via the tenant systems $102_1$-$102_3$.

In one implementation, the multi-tenant server 104 may be any computing device that provides users access to resources via the tenant systems $102_1$-$102_3$ and the communication network(s) 106. For example, the multi-tenant server 104 may provide users of the tenant systems $102_1$-$102_3$ access to data in one or more physical objects and/or one or more corresponding distributed peer ledgers that describe changes to the physical objects. For example, a physical object of the tenant system $102_1$ may correspond to a medical lab report. In this example implementation, the records in the physical object may include a lab report identifier field, a patient name field, a lab network identifier field, a lab test identifier field, a patient identifier field, and a social security number field. When an alteration/change is desired to a physical object of a tenant system $102_1$-$102_3$ (e.g., addition of a new record to a physical object or modification of an existing record in a physical object), the multi-tenant server 104 uses the transaction queue 104A, the tenant level objects 104B, the network level objects 104C, and the blockchain services 104D to attempt to make these alterations in the peer-to-peer blockchain network 108 (e.g., alterations reflected in physical objects and distributed ledgers associated with the tenant systems $102_1$-$102_3$).

The multi-tenant server 104 may include various elements of hardware and software of a multi-tenant system. As used herein, the term "multi-tenant system" refers to those systems in which various elements of hardware and software may be shared by one or more tenants. For example, the multi-tenant server 104 may simultaneously process requests for a great number of tenants, and a given database table may store records for a potentially much greater number of tenants. The multi-tenant server 104 may include an application platform including a framework (e.g., services and metadata) that allows applications to execute, such as the hardware or software infrastructure of the system. In one implementation, the multi-tenant server 104 includes separate virtual spaces/organizations (sometimes referred to as portions or partitions) for data/objects as well as services of each tenant system $102_1$-$102_3$. For example, each tenant system $102_1$-$102_3$ may be assigned a separate virtual space/organization. Each virtual space/organization is a logical partition within the multi-tenant server 104 and includes separate tenant level objects 104B that are only accessible to that tenant system $102_1$-$102_3$ and are inaccessible to other tenant systems $102_1$-$102_3$ (e.g., tenant systems $102_1$-$102_3$ cannot read and/or write tenant level objects 104B of another tenant system $102_1$-$102_3$) in addition to services used by the multi-tenant server 104 on behalf of the corresponding tenant system $102_1$-$102_3$ (e.g., blockchain services 104D).

As shown in FIG. 1, the peer-to-peer blockchain network 108 may include the tenant systems $102_1$-$102_3$, which each represent tenants/peers. The peer-to-peer blockchain network 108 shown in FIG. 1 is a representation of peers/tenants within the blockchain network 108. In some embodiments, the peer-to-peer blockchain network 108 may be viewed as a distributed network that is controlled by the multi-tenant server 104 with inputs/requests from the tenant systems $102_1$-$102_3$. As described above and as will be described in greater detail below, the multi-tenant server 104 may perform various functions/operations on behalf of the tenant systems $102_1$-$102_3$. For example, the multi-tenant server 104 may perform blockchain functions/operations on behalf on the tenant systems $102_1$-$102_3$ using the blockchain services 104D. As noted above, in some implementations, the blockchain functions/operations may be performed in separate virtual spaces/organizations associated with respective tenant systems $102_1$-$102_3$.

Although shown with three tenants/peers (e.g., the tenant systems $102_1$-$102_3$), in other implementations, the peer-to-peer blockchain network 108 may include more or fewer tenants/peers. For example, the peer-to-peer blockchain network 108 may include two, four, five, or more tenants/peers with corresponding tenant systems 102. Accordingly, the use of three tenants/peers is for illustrative purposes.

Figure 2A:
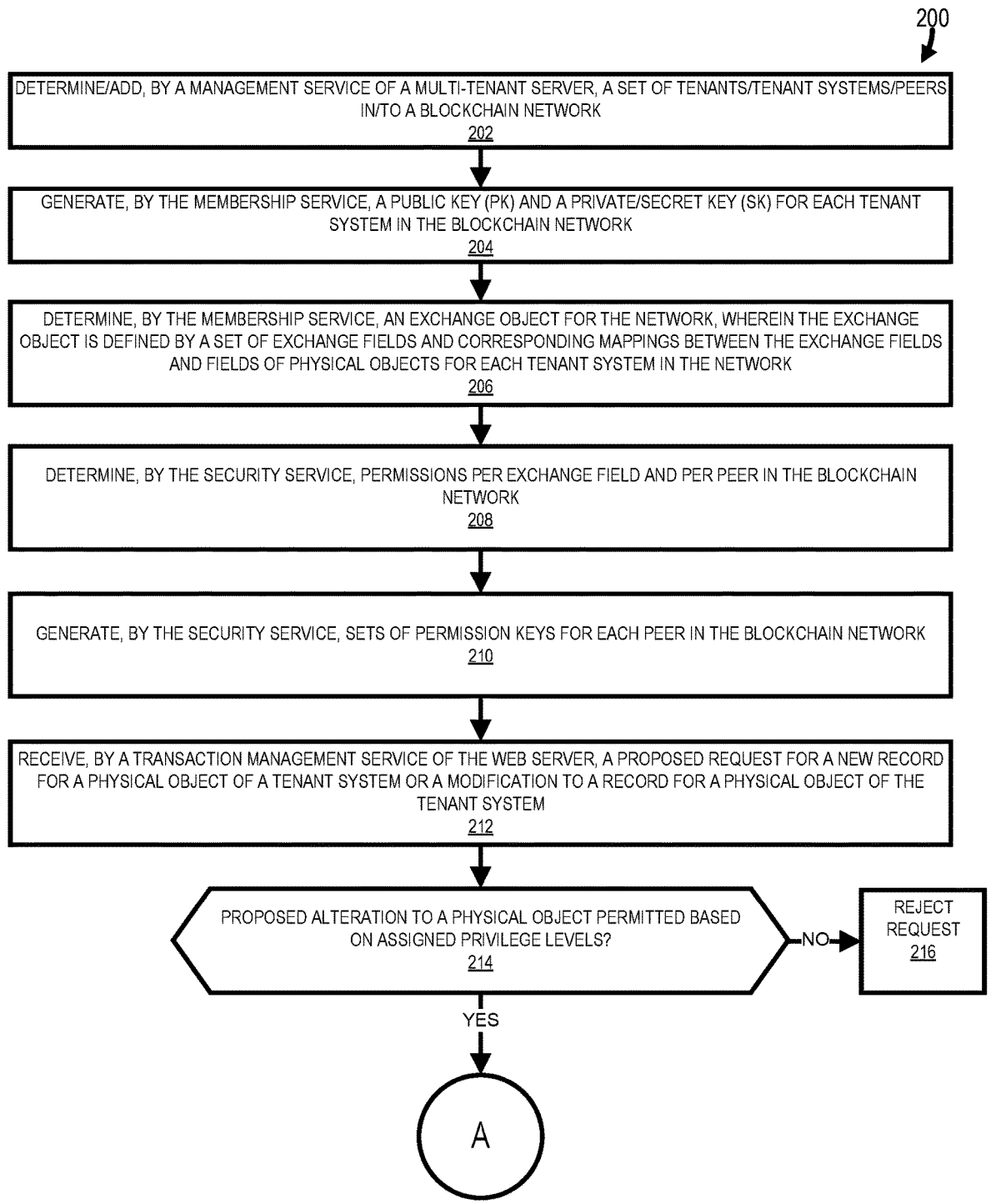
FIGS. 2A-2B show a method for the multi-tenant server to manage data in a peer-to-peer blockchain network, according to one example implementation.
Figure 2B:
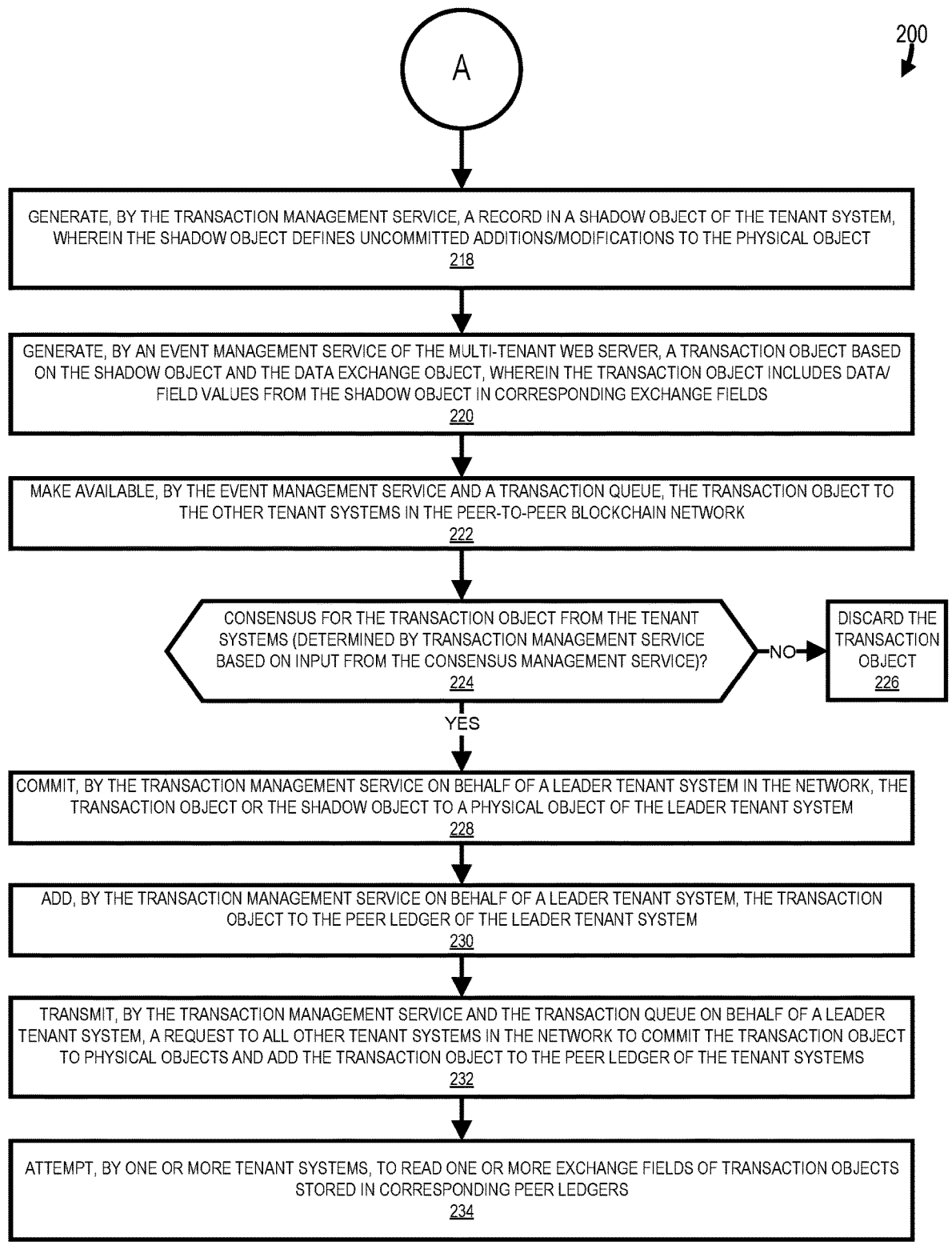

Turning now to FIGS. 2A and 2B, a method 200 according to some implementations will be described for the multi-tenant server 104 to manage data in the peer-to-peer blockchain network 108. In particular, the multi-tenant cloud environment provided by the multi-tenant server 104 may be used for managing permissions/privileges of tenant systems $102_1$-$102_3$ for data in the peer-to-peer blockchain network 108.

Figure 3A:
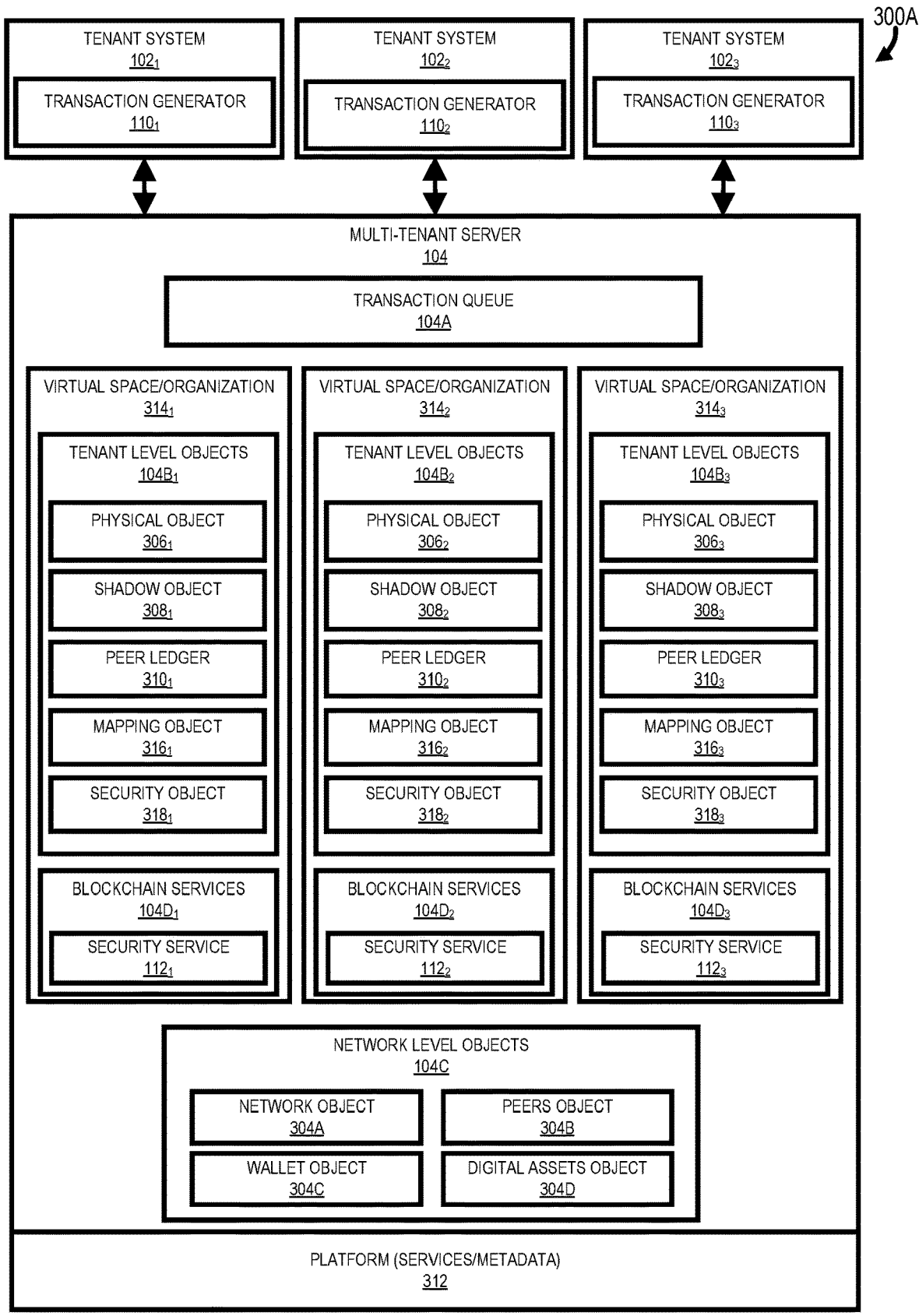
FIG. 3A shows the computing environment, including a set of separate blockchain services per tenant system, according to one example implementation.
Figure 3B:
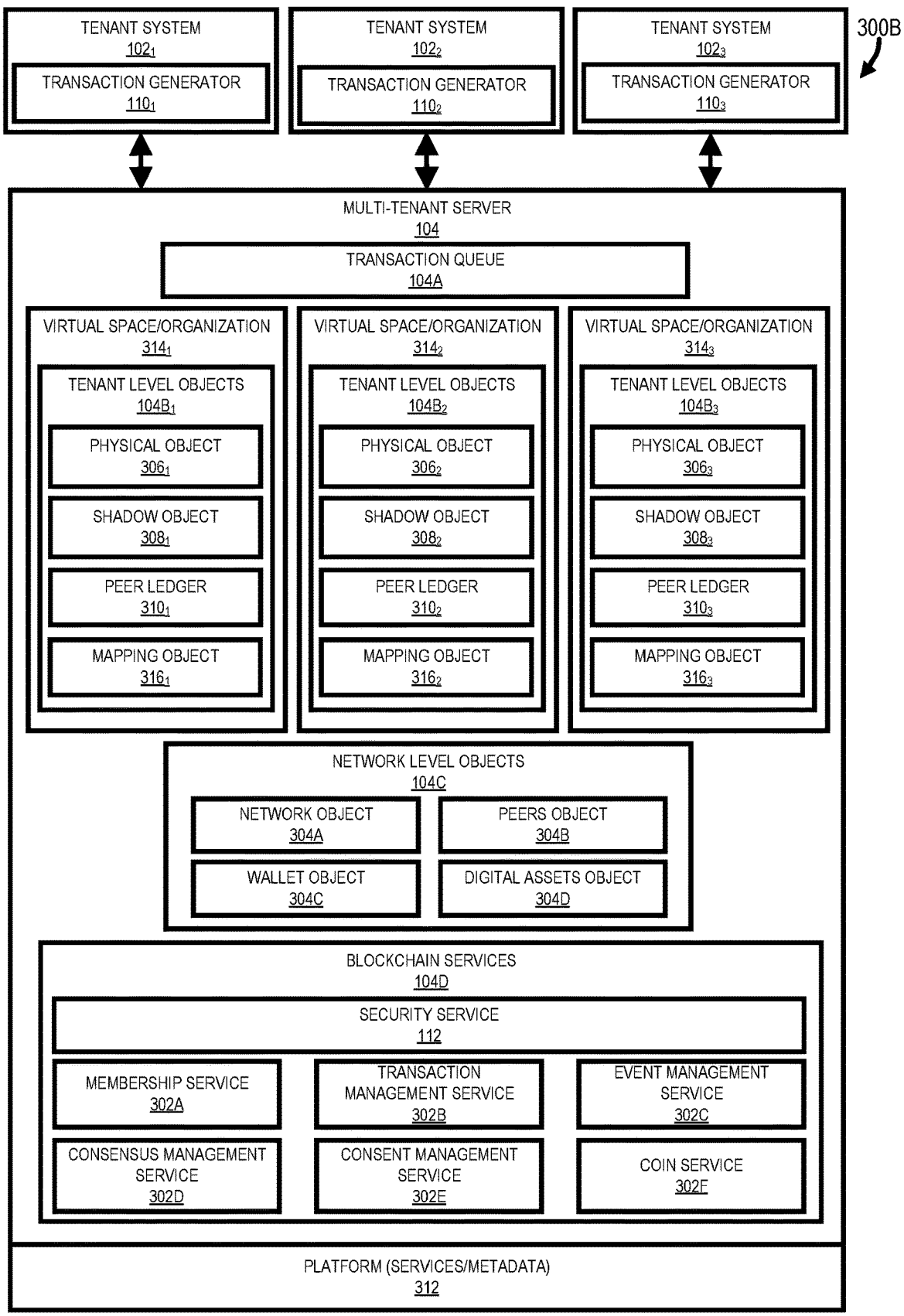
FIG. 3B shows the computing environment, including a set of shared blockchain services, according to another example implementation.

The method 200 will be described in relation to the example computing environment 100 shown in FIG. 1, the example computing environment 300A shown in FIG. 3A, and/or the example computing environment 300B shown in FIG. 3B. However, in other implementations, the method 200 may operate in other environments, including different implementations of the multi-tenant server 104.

As noted above, the operations in the flow diagram of FIGS. 2A and 2B will be described with reference to the exemplary implementations of the other figures. However, it should be understood that the operations of the flow diagram can be performed by implementations other than those discussed with reference to the other figures, and the implementations discussed with reference to these other figures can perform operations different than those discussed with reference to the flow diagrams.

Although described and shown in FIGS. 2A and 2B in a particular order, the operations of the method 200 are not restricted to this order. For example, one or more of the operations of the method 200 may be performed in a different order or in partially or fully overlapping time periods. Accordingly, the description and depiction of the method 200 is for illustrative purposes and is not intended to restrict to a particular implementation.

As shown in FIG. 2A, the method 200 may commence at operation 202 with the membership service 302A of the blockchain services 104D determining and/or adding a set of tenants (sometimes referred to as peers) to the peer-to-peer blockchain network 108. In some implementations, the peer-to-peer blockchain network 108 is identified in the network object 304A and the tenants for the peer-to-peer blockchain network 108 are identified in the peers object 304B (e.g., tenants represented by identifiers of the tenant system $102_1$-$102_3$). For example, the membership service 302A may determine a set of tenants in the peer-to-peer blockchain network 108 by examining the peers object 304B at operation 202. In some implementations, adding a tenant/tenant system $102_1$-$102_3$ to the peer-to-peer blockchain network 108 may require consensus through a process of verification/validation from the current tenants/tenant systems $102_1$-$102_3$ in the peer-to-peer blockchain network 108. In the example computing environment 100 of FIG. 1, the example computing environment 300A of FIG. 3A, and the example computing environment 300B of FIG. 3B and for purposes of illustrating the method 200 hereinafter, the membership service 302A determines at operation 202 that the peer-to-peer blockchain network 108 includes the tenant systems $102_1$-$102_3$, which represent tenants/peers.

As noted above, each of the tenant systems $102_1$-$102_3$ may include a separate virtual space/organization within the multi-tenant server 104. Each virtual space/organization includes separate tenant level objects 104B that are only accessible to that tenant system $102_1$-$102_3$ and is inaccessible to other tenant systems $102_1$-$102_3$ (e.g., tenant systems $102_1$-$102_3$ cannot read and/or write tenant level objects 104B of another tenant system $102_1$-$102_3$), in addition to services used by the multi-tenant server 104 on behalf of the corresponding tenant systems $102_1$-$102_3$ (e.g., blockchain services 104D). For example, as shown in FIG. 3A, each tenant system $102_1$-$102_3$ may be associated with a separate virtual space/organization $314_1$-$314_3$ with corresponding tenant level objects $104B_1$-$104B_3$ (e.g., physical objects $306_1$-$306_3$, shadow objects $308_1$-$308_3$, peer ledgers $310_1$-$310_3$, and mapping objects $316_1$-$316_3$) and blockchain services $104D_1$-$104D_3$. Although shown in FIG. 3A as separate instantiations of the blockchain services $104D_1$-$104D_3$ for each virtual space/organization $314_1$-$314_3$, each virtual space/organization $314_1$-$314_3$ may instead have separate access to a single instantiation of the blockchain services 104D as shown in FIG. 3B.

At operation 204, the membership service 302A may generate a set of public keys (PKs) and private/secret keys (SKs) for each tenant/tenant system $102_1$-$102_3$ in the peer-to-peer blockchain network 108. In one implementation, the public keys are generated based on a determined private key. For example, a one-way cryptographic hash function (e.g., SHA256) may be used to generate public keys for the tenant systems $102_1$-$102_3$ based on corresponding private keys. In one implementation, the public keys and the private/secret keys may be stored by the membership service 302A in the wallet object 304C following generation at operation 204. As will be described in greater detail below, the transaction queue 104A may utilize the private/secret keys stored in the wallet object 304C for generating transaction objects and sets of permission keys for each of the tenant systems $102_1$-$102_3$. In particular, the public keys and private/secret keys may be used by the transaction queue 104A for implementing cryptographic elements of transactions used by the peer-to-peer blockchain network 108 and the security service 112 may use the permission keys for enforcing permission/privileges of tenant systems $102_1$-$102_3$.

Figure 4:
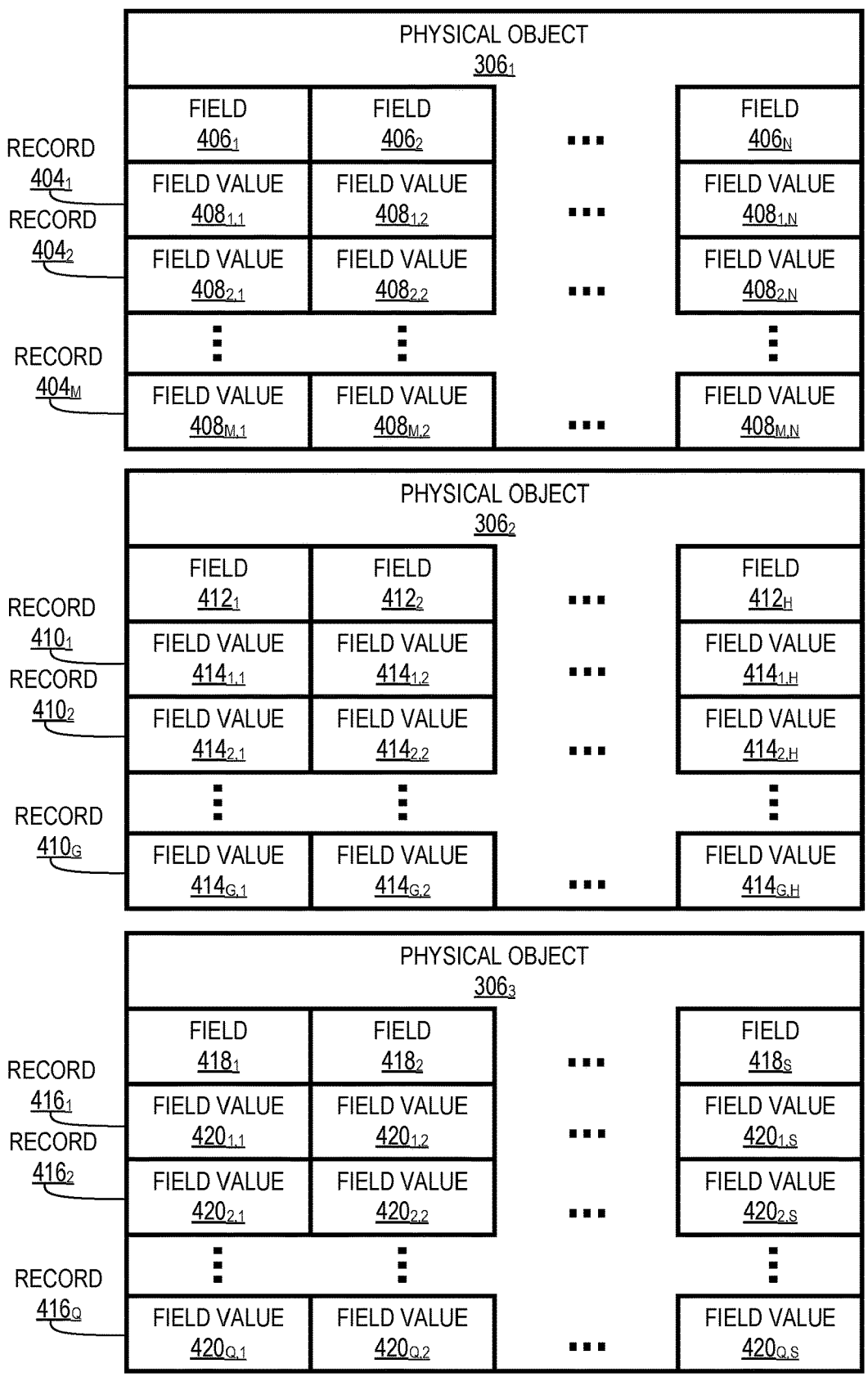
FIG. 4 shows physical objects corresponding to a set of tenant systems, according to one example implementation.

At operation 206, the membership service 302A may determine an exchange object for the peer-to-peer blockchain network 108. In one implementation, the exchange object is defined by a set of exchange fields and mapping metadata that defines mappings between each exchange field and fields in physical objects of the tenant systems $102_1$-$102_3$. For example, FIG. 4 shows physical objects $306_1$-$306_3$ for the tenant systems $102_1$-$102_3$, respectively. In this example, the physical object $306_1$, corresponding to the tenant system $102_1$, includes records $404_1$-$404_M$, which are composed of fields $406_1$-$406_N$, and each record $404_1$-$404_M$ includes values $408_{1,1\text{-}M,N}$ for each field $406_1$-$406_N$. Similarly, the physical object $306_2$, corresponding to the tenant system $102_2$, includes records $410_1$-$410_G$, which are composed of fields $412_1$-$412_H$, and each record $410_1$-$410_G$ includes values $414_{1,1\text{-}G,H}$ for each field $412_1$-$412_H$. Likewise, the physical object $306_3$, corresponding to the tenant system $102_3$, includes records $416_1$-$416_Q$, which are composed of fields $418_1$-$418_S$, and each record $416_1$-$416_Q$ includes values $420_{1,1}$-Qs for each field $418_1$-$418_S$. Each of the physical objects $306_1$-$306_3$ may represent any type of data. For example, the tenant system $102_1$ may operate in or otherwise correspond to a medical laboratory. In this example, the physical object $306_1$ may represent medical lab reports (e.g., each of the records $404_1$-$404_M$ may correspond to separate medical lab reports). The tenant system $102_2$ may operate in or otherwise correspond to a doctor's office. In this example, the physical object $306_2$ may represent a patient file (e.g., each of the records $410_1$-$410_G$ may correspond to separate patient files).

Figure 5:
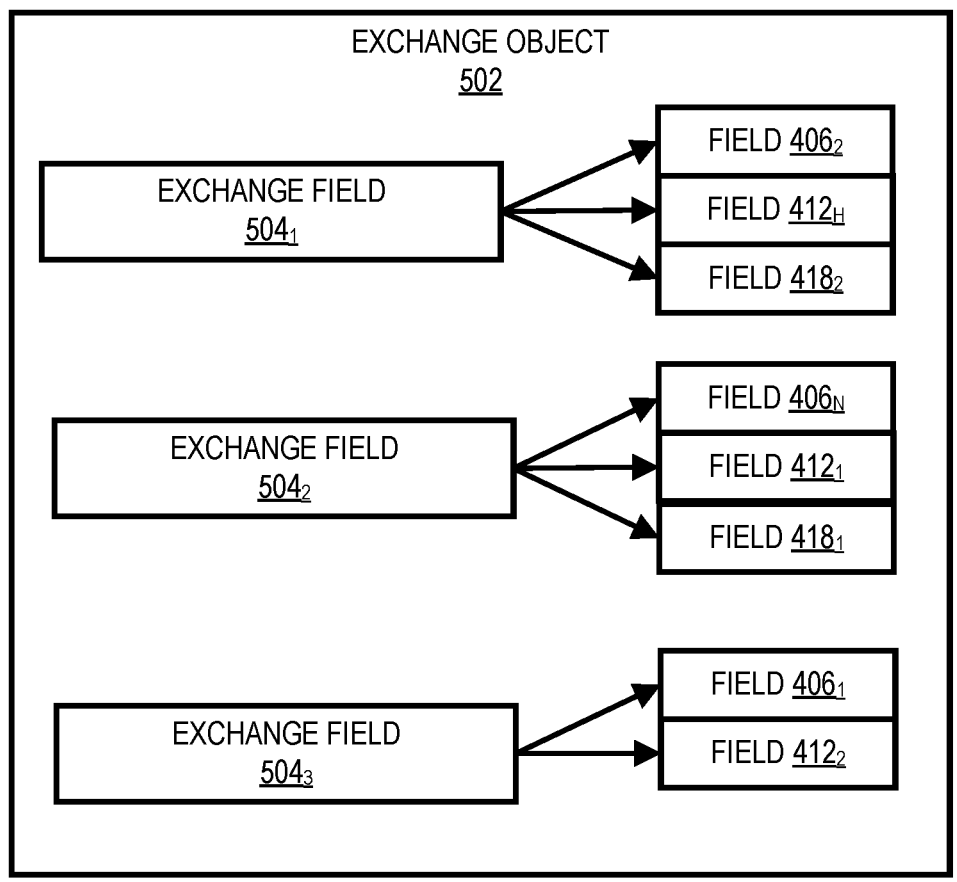
FIG. 5 shows an exchange object, including a set of mappings between exchange fields and fields of physical objects, according to one example implementation.

For the example physical objects $306_1$-$306_3$ shown in FIG. 4, the membership service 302A may determine an exchange object 502 as shown in FIG. 5, which may be stored in the digital assets object 304D. As shown in FIG. 5, the exchange object 502 is defined by the exchange fields $504_1$-$504_3$ and the mapping metadata that maps exchange fields 504 to fields of physical objects 306. In this configuration, the exchange field $504_1$ maps to the field $406_2$ of the physical object $306_1$, the field $412_H$ of the physical object $306_2$, and the field $418_2$ of the physical object $306_3$. The exchange field $504_2$ maps to the field $406_N$ of the physical object $306_1$ and the field $412_1$ of the physical object $306_2$, and the field $418_1$ of the physical object $306_3$. The exchange field $504_3$ maps to the field $406_1$ of the physical object $306_1$ and the field $412_2$ of the physical object $306_2$. Accordingly, the mapping metadata of the exchange object 502 maps/links exchange fields 504 to fields of physical objects 306. In some implementations, the number of exchange fields $504_1$-$504_3$ (i.e., three) is less than (1) the number of fields $406_1$-$406_N$ in the physical object $306_1$ (i.e., N), (2) the number of fields $412_1$-$412_H$ in the physical object $306_2$ (i.e., H), and/or (3) the number of fields $418_1$-$418_S$ in the physical object $306_3$ (i.e., S). Accordingly, a generated transaction object, which will be distributed amongst the tenant systems $102_1$-$102_3$, and corresponding data/information included in distributed peer ledgers 310 may not include sensitive data.

The mapping of exchange fields 504 to fields 406, 412, and 418 of physical objects $306_1$-$306_3$ indicates a relationship between the fields 406, 412, and 418 of physical objects $306_1$-$306_3$. For instance, using the example above in which the physical object $306_1$ represents medical lab reports and the physical object $306_2$ represents patient files, the field $406_2$ of the physical object $306_1$ may correspond to a patient identifier for which a corresponding medical lab report was generated and the field $412_H$ of the physical object $306_2$ may correspond to a patient identifier for which a corresponding patient file represents. As shown in FIG. 5 and described above, these fields $406_2$ and $412_H$ are mapped to the same exchange field $504_1$, indicating that these fields $406_2$ and $412_H$ represent similar data (e.g., the fields $406_2$ and $412_H$ both represent patient identifiers).

In some implementations, each tenant/tenant system $102_1$-$102_3$ may be part of multiple blockchain networks, including the blockchain network 108. Each of these blockchain networks may include overlapping membership with the blockchain network 108 and/or may include additional peers/tenant systems 102. In some implementations, the network object 304A may include identifiers for each blockchain network managed by the multi-tenant server 104, the peers object 304B may include identifiers for each peer/tenant system 102 in the blockchain networks managed by the multi-tenant server 104, the wallet object 304C may include keys for each peer/tenant system 102 in the blockchain networks managed by the multi-tenant server 104, and the digital assets object 304D may include exchange objects 502 for each blockchain network managed by the multi-tenant server 104. In some implementations, the tenant level objects 104B for each tenant system 102 may include a mapping object 316. Each mapping object 316 includes the mapping metadata for the corresponding tenant system 102. For example, the mapping object $316_1$, which corresponds to the tenant system $102_1$, includes mapping metadata that maps exchange field $504_1$ to field $406_2$ of the physical object $306_1$; exchange field $504_2$ to field $406_N$ of the physical object $306_1$; and exchange field $504_3$ to field $406_1$ of the physical object $306_1$. In contrast, the mapping object $316_2$, which corresponds to the tenant system $102_2$, includes mapping metadata that maps exchange field $504_1$ to field $412_H$ of the physical object $306_2$; exchange field $504_2$ to field $412_1$ of the physical object $306_2$; and exchange field $504_3$ to field $412_2$ of the physical object $306_2$. Lastly, the mapping object $316_3$, which corresponds to the tenant system $102_3$, includes mapping metadata that maps exchange field $504_1$ to field $418_2$ of the physical object $306_3$ and exchange field $504_2$ to field $418_1$ of the physical object $306_3$. Accordingly, each mapping object 316 only includes mapping metadata associated with a corresponding tenant system 102.

At operation 208, the security service 112 may determine permissions/privileges (sometimes referred to as permission/privilege levels) per each exchange field 504 and tenant system 102. For example, the blockchain network 108 may offer read, update, and insert privileges per each exchange field 504. In this example, the security service 112 may determine that the tenant system $102_1$ has read, update, and insert permissions for the exchange fields $504_1$-$504_3$. In contrast, the tenant system $102_2$ may only have read permission for the exchange field $504_1$ and read and update permissions for the exchange fields $504_2$ and $504_3$. Lastly, the tenant system $102_3$ may have no permissions/privileges in relation to the exchange field $504_1$ and read, update, and insert privileges for the exchange fields $504_2$ and $504_3$. The determination of privileges/permissions at operation 208 may be based on an indication from an administrator or a subscription level of the tenant systems 102.

Figure 6:
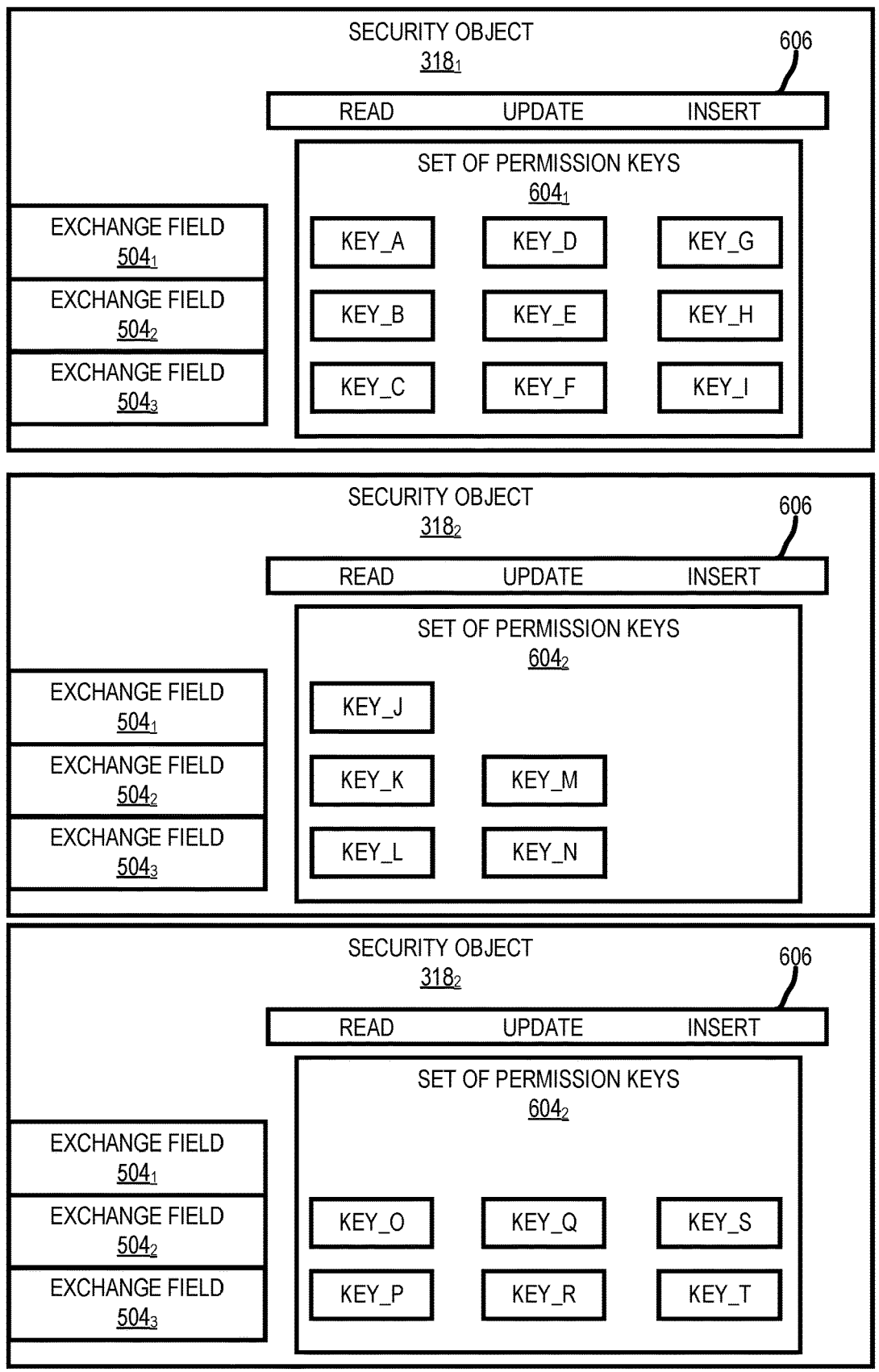
FIG. 6 shows security objects for each of the tenant systems, according to one example implementation.

At operation 210, the security service 112 may generate a set of permissions keys for each tenant system 102. The sets of permissions keys may be used by or on behalf of the tenant systems 102 for accessing one or more exchange fields 504. For example, each set of permission keys may include a separate key for each exchange field 504 and each permission/privilege level of a tenant system 102. For example, FIG. 6 shows security objects $318_1$-$318_3$ for each of the tenant systems $102_1$-$102_3$, respectively. As shown, sets of keys $604_1$-$604_3$ are provided per exchange field 504 for each permission/privilege level 606 associated with a corresponding tenant system 102. These sets of keys $604_1$-$604_3$ may be generated based on one or more of the public and private keys of each respective tenant system 102 and may be used for reading, updating, and inserting exchange fields 504 into the blockchain network 108 via corresponding transaction objects and peer ledgers 310.

At operation 212, the transaction management service 302B of the blockchain services 104D may receive (1) a proposed new record to add to a physical object $306_1$-$306_3$ or (2) a modification to an existing record of a physical object $306_1$-$306_3$. For instance, as described in the above example, the physical object $306_1$ may correspond to medical lab reports and the transaction management service 302B of the virtual space/organization $314_1$ may receive a request to add/insert a new lab report record 404 at operation 212 from the tenant system $102_1$. In another example, again the physical object $306_1$ may correspond to medical lab reports and the transaction management service 302B of the virtual space/organization $314_1$ may receive a request to modify an existing lab report record 404 at operation 212 from the tenant system $102_1$. For purposes of explanation, the method 200 will be described in relation to the transaction management service 302B of the virtual space/organization $314_1$ receiving a request to add/insert a record to the physical object $306_1$ at operation 212 from the tenant system $102_1$. However, the method 200 may work in a similar fashion for modification of a physical object 306.

At operation 214, the security service 112 may determine if the tenant system $102_1$ has adequate permissions/privileges to perform the received request from operation 212 (i.e., the security service 112 determines whether the tenant system $102_1$ is authorized to add/insert a new lab report record 404). In one implementation, this determination is based on the security object $318_1$, which includes keys for each permission/privilege level 606 of the tenant system $102_1$. In particular, in response to failing to locate a permission key for each exchange field 504 requested to be inserted and corresponding to the insert permission/privilege 606, the security service 112 may determine at operation 214 that the tenant system $102_1$ does not have adequate permissions/privileges to perform the received request from operation 212 and the method 200 may move to operation 216 to reject the request from operation 212.

In contrast, in response to locating a permission key for each exchange field 504 requested to be inserted and corresponding to the insert permission/privilege 606, the security service 112 may determine at operation 214 that the tenant system $102_1$ has adequate permissions/privileges to perform the received request from operation 212 and the method 200 may move to operation 218, as shown in FIG. 2B.

At operation 218, the transaction management service 302B of the virtual space/organization $314_1$ generates a record in a shadow object $308_1$ corresponding to the received request (i.e., the new record) of operation 212. The shadow object $308_1$ may correspond to the tenant system $102_1$ and may include all the fields $406_1$-$406_N$ of the physical object $306_1$. In contrast to the physical object $306_1$, which stores committed data that is also represented in a corresponding peer ledger $310_1$ of the tenant system $102_1$ (e.g., additions/modifications to records 404 of the physical object $306_1$ of the tenant system $102_1$), the shadow object $308_1$ represents un-committed data to the physical object $306_1$. As will be described in greater detail below, the data in the shadow object $308_1$ of the tenant system $102_1$ needs to be validated/verified through consensus by the other tenant systems $102_2$ and $102_3$ before being committed to the physical object $306_1$ and represented by the peer ledger $310_1$ of the tenant system $102_1$. This committal and representation may also extend to the physical objects $306_2$ and $306_3$ and peer ledgers $310_2$ and $310_3$ of the tenant systems $102_2$ and $102_3$ as will be described in greater detail below.

Figure 7:
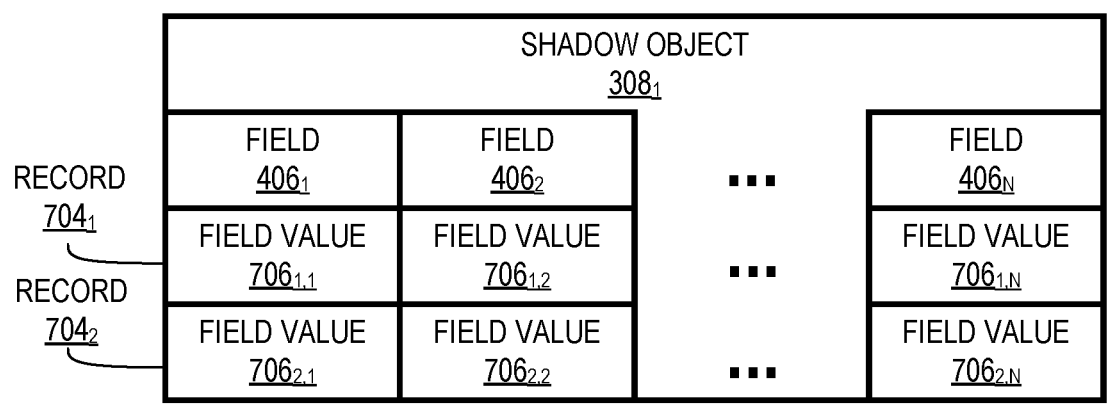
FIG. 7 shows an example of a shadow object corresponding to a tenant system, according to one example implementation.

FIG. 7 shows an example of a shadow object $308_1$ corresponding to the tenant system $102_1$ and the physical object $306_1$, according to one example implementation. As shown, the shadow object $308_1$ includes two records $704_1$ and $704_2$, corresponding to two separate proposed alterations to the physical object $306_1$. For example, the first record $704_1$ corresponds to the addition/insertion of a record 404 in the physical object $306_1$ and the second record $704_2$ corresponds to the modification/update of one or more field values 408 for the newly added/inserted record 404 in the physical object $306_1$. For instance, the first record $704_1$ may propose the addition/insertion of a record 404 corresponding to a medical lab report, while the second record $704_2$ may propose the modification of several fields values 408 of the new medical lab report record 404 (e.g., modification/update of a field value 408 corresponding to the status of the medical lab report).

At operation 220, the event management service 302C and/or the transaction queue 104A may generate a transaction object based on (1) the record $704_1$ added to the shadow object $308_1$ at operation 218 and (2) the exchange object 502 of the peer-to-peer blockchain network 108. In particular, the transaction object may include values for each of the exchange fields $504_1$-$504_3$ and data/field values from the record $704_1$ added to the shadow object $308_1$ at operation 218 in corresponding exchange fields $504_1$-$504_3$. For example, FIG. 8 shows an example of a transaction object 802, according to one example implementation.

As shown in FIG. 8, the transaction object 802 includes all the exchange fields $504_1$-$504_3$ of the exchange object 502 and field values 706 from the record $704_1$ in the shadow object $308_1$ in the appropriate positions based on the mapping between exchange fields $504_1$-$504_3$ and fields 406 of the physical object $306_1$. Although shown in relation to the record $704_1$, a separate transaction object 802 may be generated for the record $704_2$. As will be described below, the transaction object 802, which will be used hereinafter for purposes of illustration, may be passed or otherwise made available to the other tenant systems $102_2$ and $102_3$ to determine if there is consensus in the blockchain network 108 to commit the proposed record 404 (e.g., to verify/validate the transaction object 802).

In one implementation, generation of the transaction object 802 may include adding a signature to the transaction object based on (1) the record $704_1$ from the shadow object $308_1$, (2) a unique assigned identifier of the transaction object 802 (e.g., an identifier assigned sequentially to transaction objects 802 as they are generated), and (3) the private key of the tenant system $102_1$ (i.e., the private key of the tenant system 102 proposing the alteration). For example, the record $704_1$ and the unique assigned identifier of the transaction object 802 may be merged or otherwise combined together to form a single message and the private key of the tenant system $102_1$ may be used to encrypt the message (e.g., using a one-way cryptographic hash function, such as SHA256) to form a digital signature. Accordingly, the transaction object 802 includes the record $704_1$ from the shadow object $308_1$ along with the signature generated using the private key of the tenant system $102_1$.

In some implementations, the security service 112 may separately encrypt each exchange field 504 of the transaction object 802 using (1) the private key of the tenant system $102_1$ (i.e., the private key of the tenant system 102 proposing the alteration); (2) a permission key of each tenant system 102 that has a permission/privilege 606 related to the exchange field 504 (i.e., permission keys of tenant systems 102 that have read, update, and/or insert privileges associated with the exchange fields 504); and/or (3) a public key of each tenant system 102 that has a permission/privilege related to the exchange field 504. In these implementations, using permission keys of each tenant system 102 that has a permission/privilege related to the exchange field 504 ensures that only these tenant systems 102 have access (e.g., read access) to corresponding exchange fields 504. In some implementations, private keys, public keys, and/or permission keys may be used along with a cryptographic function (e.g., SHA256) to generate encrypted data.

At operation 222, the event management service 302C and the transaction queue 104A may make the transaction object 802 available to the other tenant systems $102_2$ and $102_3$. In some implementations, making the transaction object 802 available to the other tenant systems $102_2$ and $102_3$ includes the transaction queue 104A placing the transaction object 802 in a portion/partition of the multi-tenant server 104 accessible to the tenant systems $102_2$ and $102_3$. For example, as described above, the multi-tenant server 104 may include a separate virtual space/organization 314 for each of the tenant systems $102_1$-$102_3$. Each virtual space/organization 314 includes data and services that are only accessible to that tenant system $102_1$-$102_3$ and is inaccessible to other tenant systems $102_1$-$102_3$. At operation 222, the multi-tenant server 104 may pass the transaction object 802 from the virtual space/organization $314_1$ of the tenant system $102_1$ to the virtual spaces/organizations $314_2$ and $314_3$ of the tenant systems $102_2$ and $102_3$ such that the virtual spaces/organizations $314_2$ and $314_3$ of the tenant systems $102_2$ and $102_3$ can process/analyze the transaction object 802 for possible validation/verification. As noted above, since exchange fields 504 may be encrypted using private keys, public keys, and/or permission keys, only those tenant systems 102 with read access to an exchange field 504 may be able to determine the contents of that exchange field 504.

At operation 224, the transaction management service 302B may monitor responses from the tenant systems $102_2$ and $102_3$ to determine if consensus has been reached regarding the transaction object 802 or if consensus has failed to be reached. In one implementation, the consensus management service 302D may define the threshold or rules for use by the transaction management service 302B in determining when consensus has been reached by the tenant systems $102_2$ and $102_3$ regarding the transaction object 802. For example, in some implementations, the consensus management service 302D may indicate that consensus requires all of the tenant systems $102_2$ and $102_3$ to verify/validate the transaction object 802, while in other implementations, the consensus management service 302D may indicate that consensus requires a majority of the tenant systems $102_2$ and $102_3$ to verify/validate the transaction object 802. In some implementations, the consent management service 302E indicates the rules and/or operations used by the tenant systems $102_2$ and $102_3$, and in particular the virtual spaces/organizations $314_2$ and $314_3$ associated with the tenant systems $102_2$ and $102_3$, to determine if verification/validation of the transaction object 802 is proper. For example, the consent management service 302E may indicate that the public key of the tenant system $102_1$ is used along with the signature and message in the transaction object 802 for determining whether the transaction object 802 originated from and was authorized by the tenant system $102_1$.

At operation 226, the transaction management service 302B and the transaction queue 104A may discard the transaction object 802 in response to failing to obtain consensus from the tenant systems $102_2$ and $102_3$ (e.g., failing to obtain consensus as defined/indicated by the consensus management service 302D). In some implementations, discarding the transaction object 802 may include indicating to the tenant system $102_1$ that the transaction object 802 and corresponding alteration to the physical object $306_1$ (i.e., addition of a new record 404 to the physical object $306_1$ or modification of an existing record 404 to the physical object $306_1$) has been rejected by the peer-to-peer blockchain network 108 (i.e., consensus in the peer-to-peer blockchain network 108 was not achieved/obtained). In response to receipt of notification that the transaction object 802 and corresponding alteration to the physical object has been rejected by the peer-to-peer blockchain network 108, the virtual space/organization $314_1$ may delete the record $704_1$ in the shadow object $308_1$ corresponding to the transaction object 802.

At operation 228, the transaction management service 302B may commit the transaction object 802 and/or the record $704_1$ in the shadow object $308_1$ corresponding to the transaction object 802 for which consensus was achieved on behalf of a leader tenant system $102_1$-$102_3$. In some implementations, a leader tenant system $102_1$-$102_3$ may be randomly selected from amongst the tenant systems $102_1$-$102_3$ in the peer-to-peer blockchain network 108 by the membership service 302A. When the leader tenant system $102_1$-$102_3$ is the tenant system $102_1$ (i.e., the tenant system $102_1$-$102_3$ that instigated or was otherwise associated with the alteration to the physical object $306_1$ at operation 212), the transaction management service 302B in the virtual space/organization $314_1$ of the tenant system $102_1$ may commit the record $704_1$ in the shadow object $308_1$, which corresponds to the transaction object 802 for which consensus was achieved, on behalf of the tenant system $102_1$ at operation 220. In this situation, committal may include adding the record $704_1$ from the shadow object $308_1$ to the physical object $306_1$. When the leader tenant system $102_1$-$102_3$ is the tenant system $102_2$ or the tenant system $102_3$, the transaction management service 302B in the corresponding virtual space/organization $314_2$ and $314_3$ of the tenant systems $102_2$ and $102_3$ may commit the transaction object 802 that consensus was achieved on behalf of the tenant system $102_2$/$102_3$ at operation 220. In this situation, committal may include adding a record 410/416 to or modifying a record 410/416 in the physical object $306_2$/$306_3$ that includes the field values 706 from the shadow object $308_1$ mapped to corresponding fields 412/418 in the physical objects $306_2$/$306_3$ as indicated by the exchange object 502 or corresponding mapping object 316.

Figure 9:
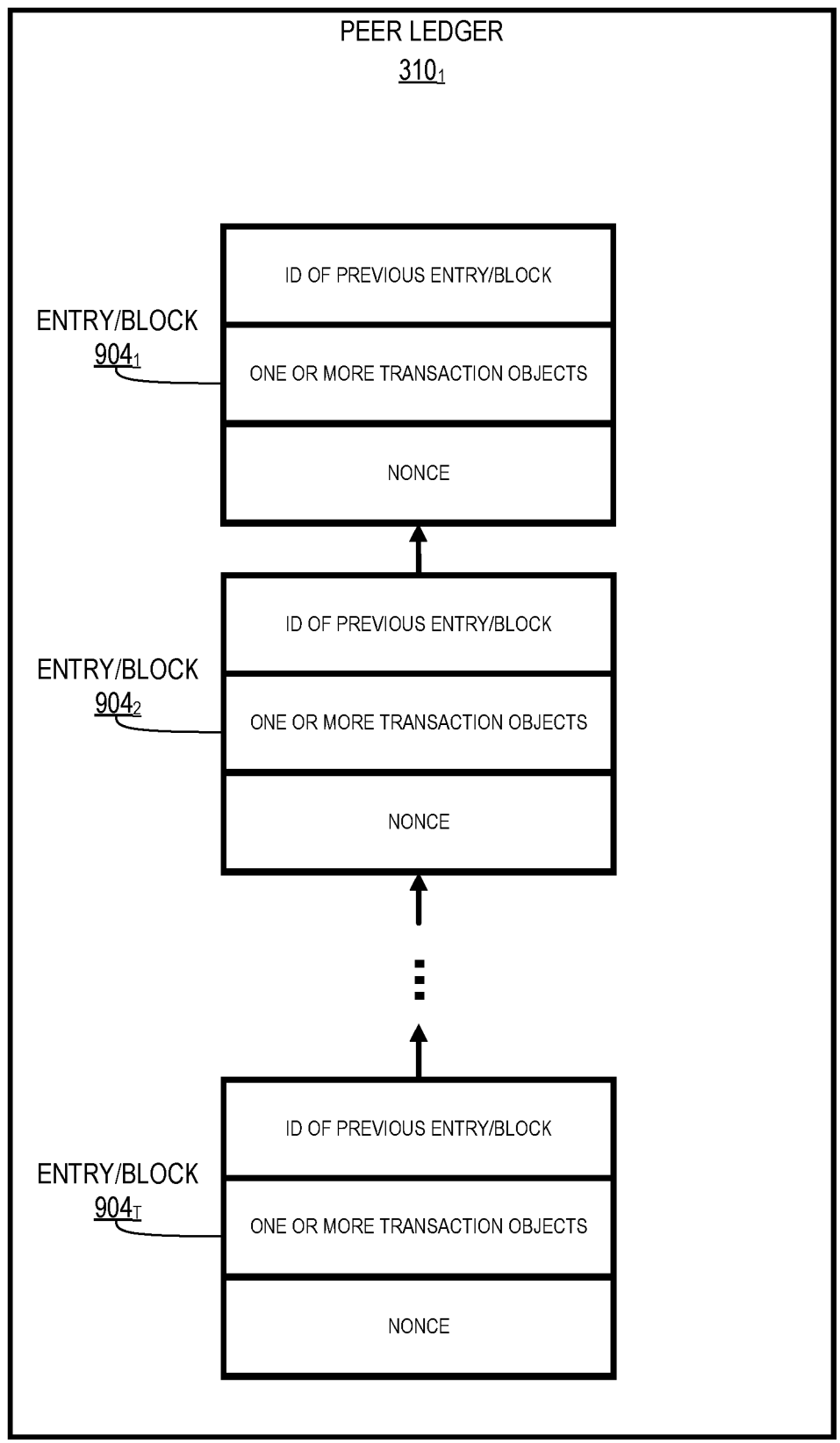
FIG. 9 shows an example of a blockchain, including a set of entries/blocks, according to one example implementation.

At operation 230, the transaction management service 302B may add an entry/block in the peer ledger $310_1$-$310_3$ corresponding to the transaction object 802 on behalf the leader tenant system $102_1$-$102_3$. In particular, the transaction management service 302B of the virtual space/organization $314_1$-$314_3$ of the leader tenant system $102_1$-$102_3$ may add an entry/block in the peer ledger $310_1$-$310_3$ corresponding to the transaction object 802 on behalf the leader tenant system $102_1$-$102_3$. The entry/block added to the peer ledger $310_1$-$310_3$ may include several pieces of information. For example, as shown in FIG. 9, each entry/block $904_1$-$904_T$ in the peer ledger $310_1$ may include a reference to the previous entry/block 904 in the peer ledger $310_1$, the transaction object 802 (along with one or more other transaction objects), and a nonce (i.e., an arbitrary number used to meet a requirement of the peer-to-peer blockchain network 108).

At operation 232, the transaction management service 302B and/or the transaction queue 104A may transmit a request or otherwise trigger the other tenant systems $102_1$-$102_3$ on behalf of the leader tenant system $102_1$-$102_3$ to commit the transaction object 802 to corresponding physical objects $306_1$-$306_3$ and add a block/entry to corresponding peer ledgers $310_1$-$310_3$. In particular, the transaction management service 302B of the virtual space/organization $314_1$-$314_3$ of the leader tenant system $102_1$-$102_3$ passes or otherwise makes available a request or otherwise triggers the transaction management service 302B of the virtual spaces/organizations $314_1$-$314_3$ of the other tenant systems $102_1$-$102_3$ to commit the transaction object 802 to corresponding physical objects $306_1$-$306_3$ and add a block/entry to corresponding peer ledgers $310_1$-$310_3$. The peer ledgers $310_1$-$310_3$ allow the computing environments 100, 300A, and/or 300B to maintain the transparency and auditability of data. In particular, the multi-tenant server 104 provides immutability to each transaction by recording/reflecting the transaction in the peer ledgers $310_1$-$310_3$, which are replicated across all the tenant systems $102_1$-$102_3$. As described above, the tenant systems $102_1$-$102_3$ participate in a consensus mechanism to verify/validate transactions/transaction objects 802 and only after the transactions/transaction objects 802 are verified/validated will the transactions/transaction objects 802 be committed to the peer ledgers $310_1$-$310_3$. In some implementations, the peer ledgers $310_1$-$310_3$ may be stored in a Merkle directed acyclic graph (DAG) structure. The Merkle DAG may be represented in an Oracle and/or HBase store. In conjunction with, after, or upon data being committed to the peer ledgers $310_1$-$310_3$, relevant physical objects $306_1$-$306_3$ will be updated with the most recent data in the peer ledgers $310_1$-$310_3$. In some implementations, the peer ledgers $310_1$-$310_3$ may also hold data describing the tenants/tenant systems $102_1$-$102_3$ that can view data or otherwise operate in the peer-to-peer blockchain network 108.

At operation 234, one or more tenant systems 102 may attempt to read one or more exchange fields 504 in a corresponding peer ledger 310. For example, the transaction object 802 that was added to the peer ledgers $310_1$-$310_3$ of the tenant systems $102_1$-$102_3$ in the example above included the exchange fields $504_1$-$504_3$. As indicated above, each of the tenant systems $102_1$-$102_3$ have assigned permission/privilege levels, which are indicated in corresponding security objects $318_1$-$318_3$. Accordingly, permission/privilege levels of tenant systems $102_1$-$102_3$ in relation to exchange fields 504 are independent. For example, at operation 234, the virtual space/organization $314_1$ of the tenant system $102_1$ may attempt to read the exchange field $504_1$ of a transaction object 802 stored in the peer ledger $310_1$. Since the security object $318_1$ of the tenant system $102_1$ includes a permission key for reading the exchange field $504_1$ (i.e., KEY A), the virtual space/organization $314_1$ of the tenant system $102_1$ will be able to successfully to decode the value in the exchange field $504_1$ for the transaction object 802 stored in the peer ledger $310_1$ based on this permission key (i.e., KEY A). Similarly, since the security object $318_2$ of the tenant system $102_2$ includes a permission key for reading the exchange field $504_1$ (i.e., KEY_J), the virtual space/organization $314_2$ of the tenant system $102_2$ will be able to successfully to decode the value in the exchange field $504_1$ for the transaction object 802 stored in the peer ledger $310_2$ based on this permission key (i.e., KEY_J). However, since the security object $318_3$ of the tenant system $102_3$ does not include a permission key for reading the exchange field $504_1$, the virtual space/organization $314_3$ of the tenant system $102_3$ will not be able to successfully to decode the value in the exchange field $504_1$ for the transaction object 802 stored in the peer ledger $310_3$.

As illustrated above, the method 200 allows the multi-tenant server 104 to manage data in the peer-to-peer blockchain network 108 on behalf of the tenant systems $102_1$-$102_3$. In particular, the cloud environment provided by the multi-tenant server 104 may be used for securing data in transaction objects 802 stored in peer ledgers 310 such that unauthorized users/tenants/peers cannot view sensitive data.

In some implementations, the computing environments 300A and/or 300B may be built on top of a platform 312 comprised of services and/or metadata for implementing the other components of the multi-tenant server 104. In some implementations, the blockchain services 104D may include additional services, such as a coin service 302F for tracking records and items associated with each tenant/peer.

As used above, the term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or a tenant system) to communicate with the service. The server and client electronic devices may be operated by users respectively in the roles of administrator (also known as an administrative user) and end user.

Figure 10A:
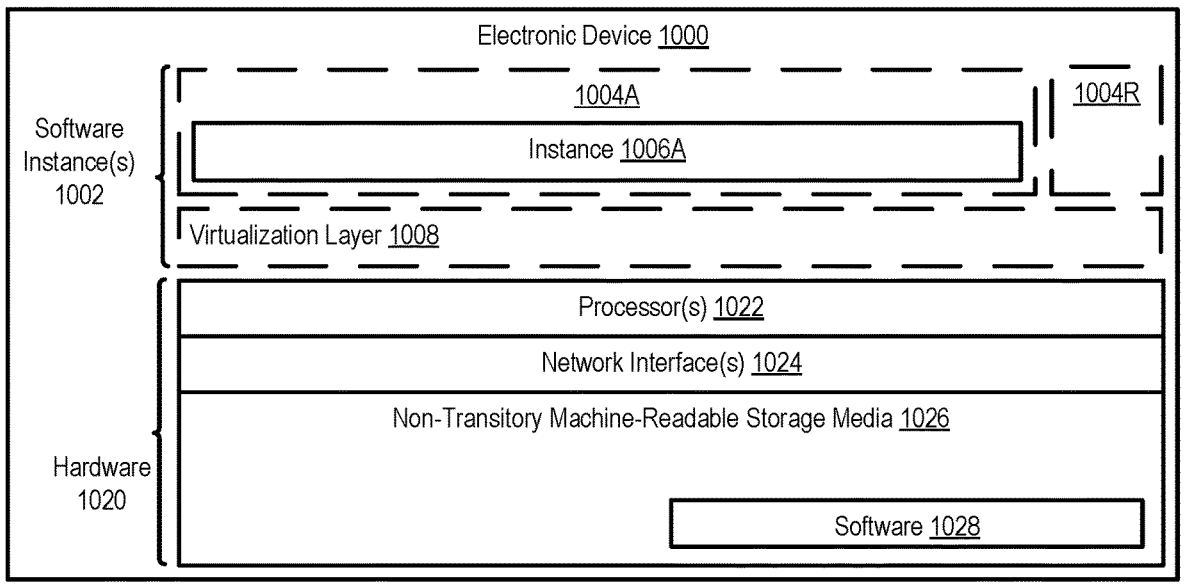
FIG. 10A shows an electronic device according to one example implementation.

FIG. 10A is a block diagram illustrating an electronic device 1000 according to some example implementations. FIG. 10A includes hardware 1020 comprising a set of one or more processor(s) 1022, a set of one or more network interfaces 1024 (wireless and/or wired), and non-transitory machine-readable storage media 1026 having stored therein software 1028 (which includes instructions executable by the set of one or more processor(s) 1022). Each of the previously described tenant systems 102 and the transaction queue 104A, the tenant level objects 104B, the network level objects 104C, and the blockchain services 104D may be implemented in one or more electronic devices 1000. In one implementation: 1) each of the tenant systems 102 is implemented in a separate one of the electronic devices 1000 (e.g., in user electronic devices operated by users where the software 1028 represents the software to implement tenant systems 102 to interface with the transaction queue 104A, the tenant level objects 104B, the network level objects 104C, and the blockchain services 104D (e.g., a web browser, a native client, a portal, a command-line interface, and/or an application program interface (API) based upon protocols such as Simple Object Access Protocol (SOAP), Representational State Transfer (REST), etc.)); 2) the transaction queue 104A, the tenant level objects 104B, the network level objects 104C, and the blockchain services 104D are implemented in a separate set of one or more of the electronic devices 1000 (e.g., a set of one or more server electronic devices where the software 1028 represents the software to implement the transaction queue 104A, the tenant level objects 104B, the network level objects 104C, and the blockchain services 104D); and 3) in operation, the electronic devices implementing the tenant systems 102 and the transaction queue 104A, the tenant level objects 104B, the network level objects 104C, and the blockchain services 104D would be communicatively coupled (e.g., by a network) and would establish between them (or through one or more other layers) connections for submitting a proposed new record or a proposed modification to an existing record in a physical object to the multi-tenant server 104. Other configurations of electronic devices may be used in other implementations (e.g., an implementation in which the tenant systems 102 and the multi-tenant server 104 are implemented on a single electronic device 1000).

In electronic devices that use compute virtualization, the set of one or more processor(s) 1022 typically execute software to instantiate a virtualization layer 1008 and software container(s) 1004A-R (e.g., with operating system-level virtualization, the virtualization layer 1008 represents the kernel of an operating system (or a shim executing on a base operating system) that allows for the creation of multiple software containers 1004A-R (representing separate user space instances and also called virtualization engines, virtual private servers, or jails) that may each be used to execute a set of one or more applications; with full virtualization, the virtualization layer 1008 represents a hypervisor (sometimes referred to as a virtual machine monitor (VMM)) or a hypervisor executing on top of a host operating system, and the software containers 1004A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1028 (illustrated as instance 1006A) is executed within the software container 1004A on the virtualization layer 1008. In electronic devices where compute virtualization is not used, the instance 1006A on top of a host operating system is executed on the "bare metal" electronic device 1000. The instantiation of the instance 1006A, as well as the virtualization layer 1008 and software containers 1004A-R if implemented, are collectively referred to as software instance(s) 1002.

Alternative implementations of an electronic device may have numerous variations from that described above. For example, customized hardware and/or accelerators might also be used in an electronic device.

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 10B:
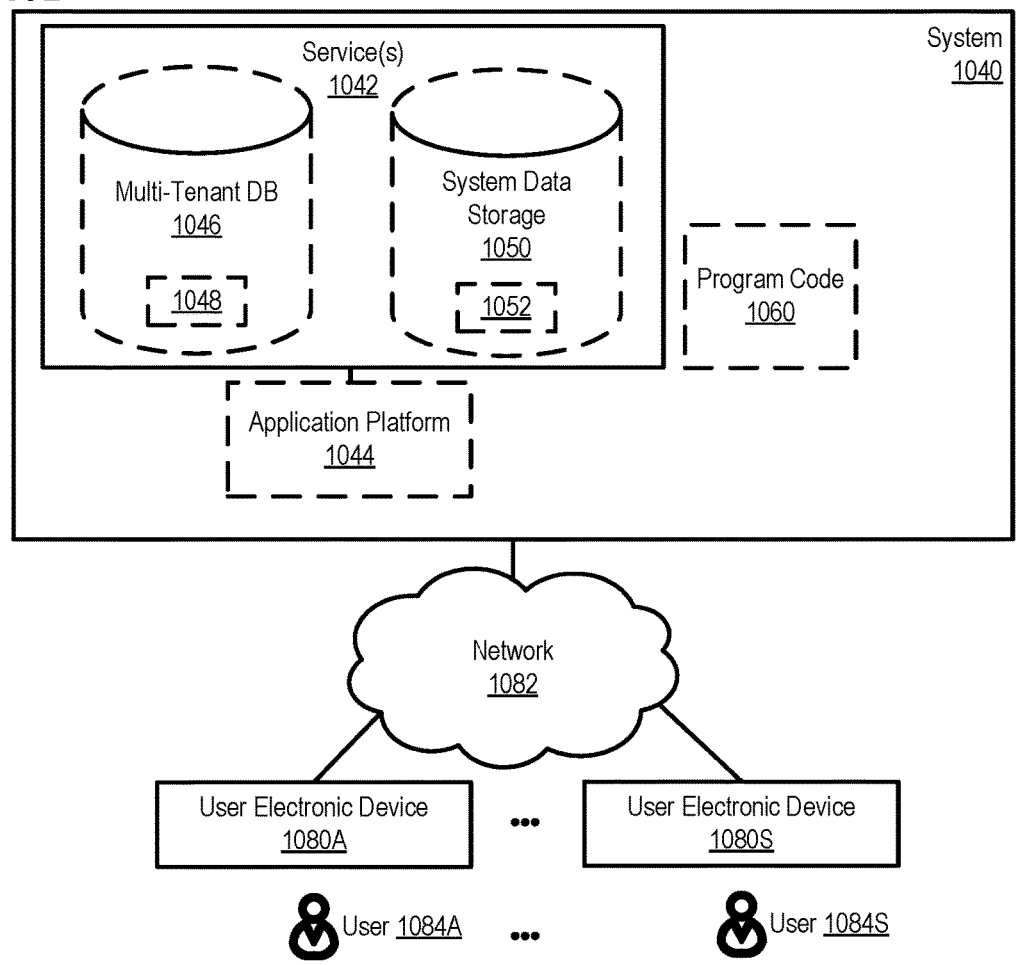
FIG. 10B shows a block diagram of an environment where the computing environment and the server may be implemented according to one example implementation.

FIG. 10B is a block diagram of an environment where the tenant systems $102_1$-$102_3$ and the multi-tenant server 104 may be deployed, according to some implementations. A system 1040 includes hardware (a set of one or more electronic devices) and software to provide service(s) 1042, including the transaction queue 104A, the tenant level objects 104B, the network level objects 104C, and the blockchain services 104D. The system 1040 is coupled to user electronic devices 1080A-S over a network 1082. The service(s) 1042 may be on-demand services that are made available to one or more of the users 1084A-S working for one or more other organizations (sometimes referred to as outside users) so that those organizations do not need to necessarily be concerned with building and/or maintaining a system, but instead makes use of the service(s) 1042 when needed (e.g., on the demand of the users 1084A-S). The service(s) 1042 may communication with each other and/or with one or more of the user electronic devices 1080A-S via one or more Application Programming Interface(s) (APIs) (e.g., a Representational State Transfer (REST) API). The user electronic devices 1080A-S are operated by users 1084A-S.

In one implementation, the system 1040 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 1040 may include an application platform 1044 that enables PAAS for creating, managing, and executing one or more applications developed by the provider of the application platform 1044, users accessing the system 1040 via one or more of user electronic devices 1080A-S, or third-party application developers accessing the system 1040 via one or more of user electronic devices 1080A-S.

In some implementations, one or more of the service(s) 1042 may utilize one or more multi-tenant databases 1046 for tenant data 1048, as well as system data storage 1050 for system data 1052 accessible to system 1040. In certain implementations, the system 1040 includes a set of one or more servers that are running on server electronic devices and that are configured to handle requests for any authorized user associated with any tenant (there is no server affinity for a user and/or tenant to a specific server). The user electronic devices 1080A-S communicate with the server(s) of system 1040 to request and update tenant-level data and system-level data hosted by system 1040, and in response the system 1040 (e.g., one or more servers in system 1040) automatically may generate one or more Structured Query Language (SQL) statements (e.g., one or more SQL queries) that are designed to access the desired information from the one or more multi-tenant database 1046 and/or system data storage 1050.

In some implementations, the service(s) 1042 are implemented using virtual applications dynamically created at run time responsive to queries from the user electronic devices 1080A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1060 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1044 includes an application setup mechanism that supports application developers' creation and management of applications, which may be saved as metadata by save routines. Invocations to such applications, including the transaction queue 104A, the tenant level objects 104B, the network level objects 104C, and the blockchain services 104D, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 1082 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 1040 and the user electronic devices 1080A-S.

Each user electronic device 1080A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 1040. For example, the user interface device can be used to access data and applications hosted by system 1040, and to perform searches on stored data, and otherwise allow a user 1084 to interact with various GUI pages that may be presented to a user 1084. User electronic devices 1080A-S might communicate with system 1040 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 1080A-S might include an HTTP client, commonly referred to as a "browser," for sending and receiving HTTP messages to and from server(s) of system 1040, thus allowing users 1084 of the user electronic device 1080A-S to access, process and view information, pages and applications available to it from system 1040 over network 1082.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for a multi-tenant server to manage data in a peer-to-peer blockchain network, the method comprising:
    generating, by the multi-tenant server, an exchange object for the peer-to-peer blockchain network, wherein the exchange object includes one or more exchange fields and a mapping between each exchange field in the one or more exchange fields and a field of a physical object associated with each peer in the peer-to-peer blockchain network;
    determining, by the multi-tenant server, a permission for each combination of exchange fields in the one or more exchange fields and peer in the peer-to-peer blockchain network;
    generating, by the multi-tenant server on behalf of a first peer in the peer-to-peer blockchain network, a transaction object based on the exchange object, wherein the transaction object includes a set of field values for the one or more exchange fields and one or more field values in the set of field values are encrypted based on the determined permissions; and
    making, by the multi-tenant server on behalf of the first peer, the transaction object available to a second peer in the peer-to-peer blockchain network to attempt to obtain consensus for altering a physical object corresponding to the first peer.

2. The method of claim 1, further comprising:
    generating, by the multi-tenant server, a first set of permission keys corresponding to the first peer; and
    generating, by the multi-tenant server, a second set of permission keys corresponding to the second peer.

3. The method of claim 2, wherein each permission key in the first set of permission keys corresponds to a permission of the first peer in relation to a first exchange field in the one or more exchange fields, and
    wherein each permission key in the second set of permission keys corresponds to a permission of the second peer in relation to a second exchange field in the one or more exchange fields.

4. The method of claim 3, wherein generating the transaction object includes encrypting the one or more field values using the first set of permissions keys.

5. The method of claim 4, wherein the first set of permission keys include read, update, and insert access permissions to corresponding exchange fields in the one or more exchange fields.

6. The method of claim 5, further comprising:
    adding, by the multi-tenant server, the transaction object to a first ledger of the first peer and a second ledger of the second peer in response to receiving consensus from the second peer in the peer-to-peer blockchain network; and
    reading, by the multi-tenant server on behalf of the second peer, the one or more field values using the second set of permission keys.

7. The method of claim 6, wherein reading the one or more field values includes decrypting a first value in the one or more field values using a first key in the second set of permission keys and decrypting a second value in the one or more field values using a second key in the second set of permission keys.

8. The method of claim 1, wherein the multi-tenant server includes a virtual space for a first peer in the peer-to-peer blockchain network,
    wherein the virtual space includes data and services available to the first peer and the data and services are inaccessible by a second peer in the peer-to-peer blockchain network.

9. A non-transitory machine-readable storage medium, including instructions that when executed by a processor of a multi-tenant server, cause the processor to:
    generate an exchange object for the peer-to-peer blockchain network, wherein the exchange object includes one or more exchange fields and a mapping between each exchange field in the one or more exchange fields and a field of a physical object associated with each peer in the peer-to-peer blockchain network;
    determine a permission for each combination of exchange fields in the one or more exchange fields and peer in the peer-to-peer blockchain network;
    generate, on behalf of a first peer in the peer-to-peer blockchain network, a transaction object based on the exchange object, wherein the transaction object includes a set of field values for the one or more exchange fields and one or more field values in the set of field values are encrypted based on the determined permissions; and
    make, on behalf of the first peer, the transaction object available to a second peer in the peer-to-peer blockchain network to attempt to obtain consensus for altering a physical object corresponding to the first peer.

10. The non-transitory machine-readable storage medium of claim 9, wherein the instructions further cause the processor to:
    generate a first set of permission keys corresponding to the first peer; and
    generate a second set of permission keys corresponding to the second peer.

11. The non-transitory machine-readable storage medium of claim 10, wherein each permission key in the first set of permission keys corresponds to a permission of the first peer in relation to a first exchange field in the one or more exchange fields, and
    wherein each permission key in the second set of permission keys corresponds to a permission of the second peer in relation to a second exchange field in the one or more exchange fields.

12. The non-transitory machine-readable storage medium of claim 11, wherein generating the transaction object includes encrypting the one or more field values using the first set of permissions keys.

13. The non-transitory machine-readable storage medium of claim 12, wherein the first set of permission keys include read, update, and insert access permissions to corresponding exchange fields in the one or more exchange fields.

14. The non-transitory machine-readable storage medium of claim 13, wherein the instructions further cause the processor to:
    add, by the multi-tenant server, the transaction object to a first ledger of the first peer and a second ledger of the second peer in response to receiving consensus from the second peer in the peer-to-peer blockchain network; and
    read, by the multi-tenant server on behalf of the second peer, the one or more field values using the second set of permission keys.

15. The non-transitory machine-readable storage medium of claim 14, wherein reading the one or more field values includes decrypting each a first value in the one or more field values using a first key in the second set of permission keys and decrypting a second value in the one or more field values using a second key in the second set of permission keys.

16. The non-transitory machine-readable storage medium of claim 9, wherein the multi-tenant server includes a virtual space for a first peer in the peer-to-peer blockchain network, wherein the virtual space includes data and services available to the first peer and the data and services are inaccessible by a second peer in the peer-to-peer blockchain network.

17. A multi-tenant server to manage data in a peer-to-peer blockchain network, the multi-tenant server comprising:
    a processor;
    a memory storing instruction that when executed by the processor cause the processor to:
        generate an exchange object for the peer-to-peer blockchain network, wherein the exchange object includes one or more exchange fields and a mapping between each exchange field in the one or more exchange fields and a field of a physical object associated with each peer in the peer-to-peer blockchain network;
        determine permissions for each combination of exchange fields in the one or more exchange fields and peer in the peer-to-peer blockchain network;
        generate, on behalf of a first peer in the peer-to-peer blockchain network, a transaction object based on the exchange object, wherein the transaction object includes a set of field values for the one or more exchange fields and one or more field values in the set of field values are encrypted based on the determined permissions; and
        make, on behalf of the first peer, the transaction object available to a second peer in the peer-to-peer blockchain network to attempt to obtain consensus for altering a physical object corresponding to the first peer.

18. The multi-tenant server of claim 17, wherein the instructions further cause the processor to:
    generate a first set of permission keys corresponding to the first peer; and
    generate a second set of permission keys corresponding to the second peer.

19. The multi-tenant server of claim 18, wherein each permission key in the first set of permission keys corresponds to a permission of the first peer in relation to a first exchange field in the one or more exchange fields, and
    wherein each permission key in the second set of permission keys corresponds to a permission of the second peer in relation to a second exchange field in the one or more exchange fields.

20. The multi-tenant server of claim 19, wherein generating the transaction object includes encrypting the one or more field values using the first set of permissions keys.

* * * * *